(12) United States Patent
Rapaport et al.

(10) Patent No.: US 9,942,918 B2
(45) Date of Patent: Apr. 10, 2018

(54) METHOD AND APPARATUS FOR VIDEO AWARE HYBRID AUTOMATIC REPEAT REQUEST

(71) Applicant: Vid Scale, Inc., Wilmington, DE (US)

(72) Inventors: Avi Rapaport, Shoham (IL); Ariela Zeira, Huntington, NY (US); Weimin Liu, Chatham, NJ (US); Liangping Ma, San Diego, CA (US); Yuriy Reznik, San Diego, CA (US); Zhifeng Chen, San Diego, CA (US); Gregory S. Sternberg, Mt. Laurel, NJ (US); Samian J. Kaur, Plymouth Meeting, PA (US); Stephen E. Terry, Northport, NY (US)

(73) Assignee: VID SCALE, INC., Wilmington, DE (US)

( * ) Notice: Subject to any disclaimer, the term of this patent is extended or adjusted under 35 U.S.C. 154(b) by 104 days.

(21) Appl. No.: 14/378,094

(22) PCT Filed: Feb. 11, 2013

(86) PCT No.: PCT/US2013/025569
§ 371 (c)(1),
(2) Date: Aug. 11, 2014

(87) PCT Pub. No.: WO2013/120074
PCT Pub. Date: Aug. 15, 2013

(65) Prior Publication Data
US 2015/0009930 A1    Jan. 8, 2015

Related U.S. Application Data

(60) Provisional application No. 61/697,759, filed on Sep. 6, 2012, provisional application No. 61/597,761, filed on Feb. 11, 2012.

(51) Int. Cl.
*H04W 4/00* (2009.01)
*H04W 74/00* (2009.01)
(Continued)

(52) U.S. Cl.
CPC ......... *H04W 74/004* (2013.01); *H04L 1/1825* (2013.01); *H04L 1/1887* (2013.01); *H04L 65/608* (2013.01); *H04W 72/085* (2013.01)

(58) Field of Classification Search
CPC ............. H04W 72/085; H04W 74/004; H04L 1/1887; H04L 45/24; H04L 45/125;
(Continued)

(56) References Cited

U.S. PATENT DOCUMENTS 6,108,307 A * 8/2000 McConnell ......... H04L 12/2854
370/235
6,766,168 B1 7/2004 Lim
(Continued)

FOREIGN PATENT DOCUMENTS

EP       2244514 A1   10/2010
JP    2004-180154 A    6/2004
(Continued)

OTHER PUBLICATIONS

Lu et al., "Video Streaming over 802.11 WLAN with Content-Aware Adaptive Retry", IEEE International Conference on Multimedia and Expo, Jul. 2005, pp. 723-726.
(Continued)

*Primary Examiner* — Harun Chowdhury
(74) *Attorney, Agent, or Firm* — Condo Roccia Koptiw LLP

(57) ABSTRACT

HARQ parameters (e.g., maximum HARQ retransmission values) may be adapted. Cross-layer control and/or logical channel control may be used to select a maximum number of HARQ retransmissions, for example based on packet
(Continued)

priority and/or QCI values. Respective priorities of video packets may be used to select one of a plurality of logical channels associated with a video application that may be established at a source wireless hop and/or a destination wireless hop. The logical channels have different HARQ characteristics. Different maximum HARQ retransmission values may be determined for select logical channels, for example such that packets of different priorities may be transmitted over different logical channels. One or more of the channels may be associated with one or more transmission queues that may have different priority designations. Video packets may be reordered (e.g., with respect to transmission order) within the transmission queues, for example in accordance with respective HARQ parameters.

23 Claims, 27 Drawing Sheets

(51) Int. Cl.
  *H04L 1/18* (2006.01)
  *H04L 29/06* (2006.01)
  *H04W 72/08* (2009.01)
(58) Field of Classification Search
  CPC ..... H04L 47/10; H04L 1/1825; H04L 65/608; H04B 7/04; H04B 7/0417
  USPC ............ 370/230, 230.1, 235, 328, 329, 338, 370/395.21, 252
  See application file for complete search history.

(56) References Cited

U.S. PATENT DOCUMENTS

| | | | |
|---|---|---|---|
| 2004/0233916 A1 | 11/2004 | Takeuchi et al. | |
| 2006/0165091 A1 | 7/2006 | Arima et al. | |
| 2006/0168133 A1* | 7/2006 | Park | H04L 29/06027 709/219 |
| 2007/0086403 A1 | 4/2007 | Hatakeyama et al. | |
| 2008/0025268 A1* | 1/2008 | Honary | H04B 7/0417 370/338 |
| 2008/0123660 A1* | 5/2008 | Sammour | H04L 47/10 370/395.21 |
| 2008/0130496 A1* | 6/2008 | Kuo | H04B 7/04 370/230.1 |
| 2010/0172335 A1 | 7/2010 | Mok | |
| 2011/0179329 A1* | 7/2011 | Kim | H04L 1/1825 714/748 |

FOREIGN PATENT DOCUMENTS

| | | | |
|---|---|---|---|
| JP | 2006-166453 A | | 6/2006 |
| JP | 2007-013462 A | | 1/2007 |
| JP | 2007-143113 A | | 6/2007 |
| WO | WO 2010/072624 A1 | | 7/2010 |
| WO | WO 2010/121708 A1 | | 10/2010 |
| WO | WO2011/064810 | * | 6/2011 |
| WO | WO 2011/064810 A1 | | 6/2011 |

OTHER PUBLICATIONS

3GPP TS 36.300, v9.8.0, "Evolved Universal Terrestrial Radio Access (E-UTRA) and Evolved Universal Terrestrial Radio Access Network (E-UTRAN); Overall description; Stage 2 (Release 9)", Sep. 2011, 174 pages.
3GPP TS 36.321, v10.1.0, "Evolved Universal Terrestrial Radio Access (E-UTRA); Medium Access Control (MAC) protocol specification (Release 10)", Mar. 2011, 53 pages.
3GPP TS 36.331, v10.0.0, "Evolved Universal Terrestrial Radio Access (E-UTRA); Radio Resource Control (RRC); Protocol specification (Release 10)", Dec. 2010, 276 pages.
3GPP TS 36.322, v10.0.0, "Evolved Universal Terrestrial Radio Access (E-UTRA); Radio Link Control (RLC) protocol specification (Release 10)", Dec. 2010, 39 pages.
3GPP TS 36.213, v10.1.0, "Evolved Universal Terrestrial Radio Access (E-UTRA); Physical layer procedures (Release 10)", Mar. 2011, 115 pages.
Itu, H.264, "Advanced Video Coding for Generic Audiovisual Services", Nov. 2007.
3GPP TS 36.211, v10.4.0: "Evolved Universal Terrestrial Radio Access (E-UTRA); Physical Channels and Modulation (Release 10)", Dec. 2011, 101 pages.
3GPP TS 36.212, v10.4.0: "Evolved Universal Terrestrial Radio Access (E-UTRA); Multiplexing and channel coding (Release 10)", Dec. 2011, 79 pages.
3GPP TS 23.203, v11.4.0: "Technical Specification Group Services and System Aspects; Policy and charging control architecture (Release 11)", Dec. 2011, 167 pages.
H. Schulzrinne, et al., "RTP Profile for Audio and Video Conferences with Minimal Control", Network Working Group RFC3551, Columbia University, Jul. 2003, 38 pages.
3GPP TS 23.401, V9.13.0: "General Packet Radio Service (GPRS) enhancements for Evolved Universal Terrestrial Radio Access Network (E-UTRAN) access (Release 9)", Jun. 2012, 225 pages.
Guan et al., "HSDPA Network Technology", China Machine Press, Beijing, Jan. 31, 2007, 9 pages.
Smith et al., "3G Wireless Networks", Posts and Telecom Press, Beijing, Feb. 28, 2003, 6 pages.

* cited by examiner

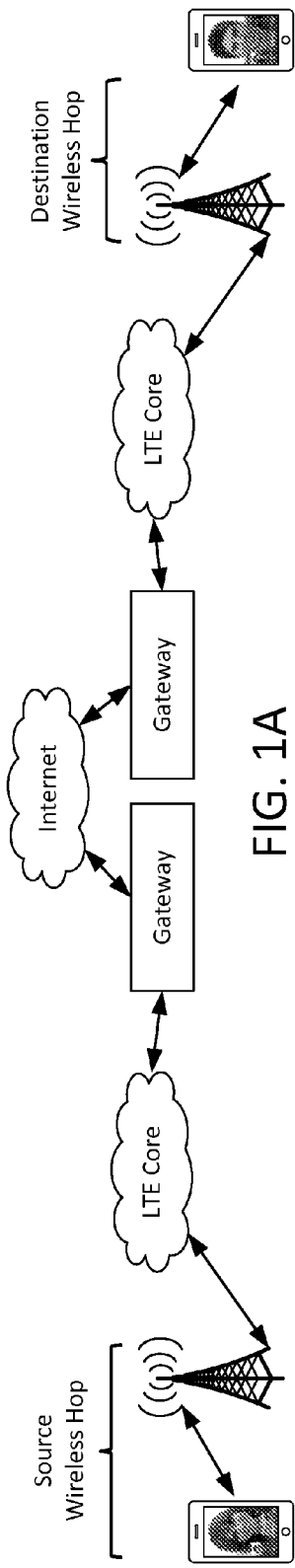
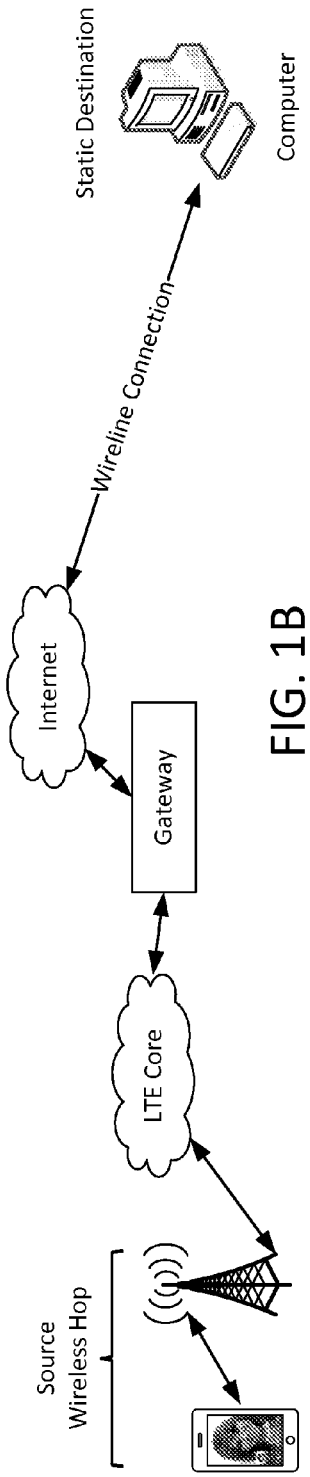
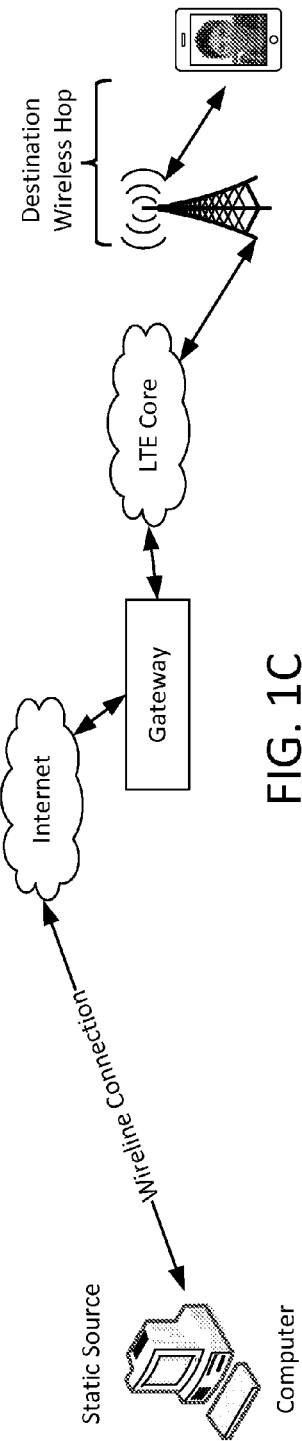
FIG. 1A
FIG. 1B
FIG. 1C

Max HARQ retransmission MAC control element

Short BSR and Truncated BSR MAC control element

Example of MAC PDU including a MAC header, MAC control elements, MAC SDUs and padding Short BSR and truncated BSR MAC control element Long BSR MAC control element Example of MAC PDU consisting of MAC header, MAC control elements, MAC SDUs and padding

METHOD AND APPARATUS FOR VIDEO AWARE HYBRID AUTOMATIC REPEAT REQUEST

CROSS-REFERENCE TO RELATED APPLICATIONS

This application is the National Stage entry under 35 U.S.C. § 371 of PCT Application No. PCT/US2013/025569, filed Feb. 11, 2013, which claims the benefit of U.S. provisional patent application Nos. 61/597,761, filed Feb. 11, 2012 and 61/697,759, filed Sep. 6, 2012, the contents of which are incorporated herein by reference in their entireties.

BACKGROUND

In recent years demand for wirelessly transmitted video, for example video transmitted to and/or received from applications executed on mobile devices, has steadily increased. Increases in wireless video demand are predicted to continue, for instance in accordance with capabilities of the LTE/LTE advanced network that offer significantly higher data transmission rates. Despite increases in bandwidth capacity of wireless communications networks, transporting video across these wireless communication networks efficiently and reliably continues to be challenging. For instance, rapid adoption of smart phones that are capable of generating and displaying video may place additional demands on these wireless communication networks. Video applications typically involve intensive use of network resources, intolerance to loss of data, and/or latency requirements (e.g., in the case of video conferencing applications, cloud gaming, and the like).

SUMMARY

Systems, methods, and instrumentalities are described herein that may relate to video transmissions. Different hybrid automatic repeat request (HARQ) parameters may be used based on video data. Cross layer control and/or logical channel control may be provided where logical channels may have different HARQ characteristics. A selection of a maximum number of HARQ retransmissions may be based on a packet priority (e.g., a packet priority value). The priority of video packets in a particular transport block may be used to adjust the maximum HARQ retransmissions. QCI values may be used to adjust the maximum HARQ retransmissions.

Maximum HARQ retransmission values may be determined by an evolved Node B (eNB) and/or may be signaled between the eNB and a user equipment (UE). HARQ parameters may be adjusted via a message synchronized to a first non-acknowledgement (NACK) feedback. HARQ parameters may be adjusted via a message, for example synchronized to a buffer status report (BSR).

An example HARQ process may include a logical channel control architecture. A plurality of logical channels may be associated with a video application (e.g., a single video application). The plurality of logical channels may be associated with one or more corresponding radio bearers. The logical channels of the plurality of logical channels may have different HARQ characteristics.

Different maximum HARQ retransmission values may be determined for select logical channels of the plurality of logical channels, for example such that packets of different priorities may be transmitted over different logical channels.

One or more of the plurality of logical channels may be associated with one or more transmission queues. The one or more transmission queues may have different priority designations (e.g., a high priority queue and a low priority queue). Video packets may be reordered (e.g., with respect to transmission order) within the one or more transmission queues, for example in accordance with respective HARQ parameters. The plurality of logical channels may be established at a source wireless hop and/or a destination wireless hop.

BRIEF DESCRIPTION OF THE DRAWINGS

FIGS. 1A-1C depict example video conferencing system architectures.

DETAILED DESCRIPTION

Figure 2:
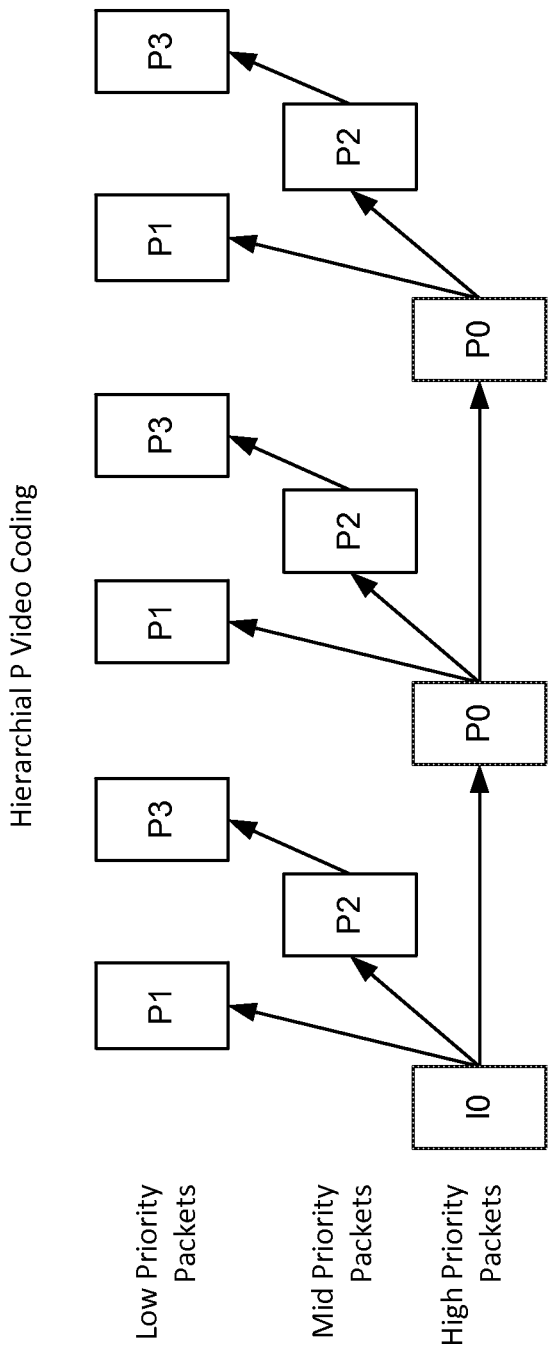
FIG. 2 depicts an example hierarchical P video coding frame priority.

Systems, methods, and instrumentalities are described herein that may relate to video transmissions. One or more of the disclosed systems, methods, and instrumentalities may improve performance associated with the transmission of wireless video in applications such as video conferencing, video streaming, cloud gaming, and the like, for instance by using adaptive HARQ retransmission. A video conferencing system over wireless may utilize one or more wireless hops (e.g., two wireless hops).

FIG. 1A depicts an example video conferencing architectures using two wireless hops and FIGS. 1B-1C depict example video conferencing architectures that each use a single wireless hop. The uplink wireless hop may be from a source user equipment (UE) to a source evolved-NodeB (eNB) and the downlink (DL) wireless hop may be from a destination eNB to a destination UE. Adaptive maximum HARQ retransmissions may be implemented one or both wireless hops. Adaptive maximum HARQ retransmissions may be implemented on a single wireless hop. The uplink wireless hop may benefit more from using adaptive maximum HARQ than the downlink wireless hop, for instance due to more frequent occurrence of bandwidth constraints in the uplink.

The HARQ controller in an LTE system may be modified to use information relating to the instantaneous packet priority of a video packet stream to change its parameters, which may improve the overall video experience. One or more packets within a video packet data stream (e.g., each packet) may be categorized with a priority. For example, the packet priorities of video packets may be generated by a video application, for example as part of the encoding process, may be generated using a video data stream analysis module that performs a type of packet inspection, or may otherwise be generated. The classification of video packets into priority may be performed using video coding methods that may generate a video frame dependent sequence that may indicate a likely impact of lost frames on video quality. Priority may be generated using hierarchical P video coding that may allow subdividing video frames into temporal layers according to respective time references, and associating the respective layers with different priority groups. Repetitive IDR frames may be utilized to recover from error propagation. A number of frames since a recent instantaneous decoder refresh (IDR) frame (e.g., the most recent, or last, IDR frame) may specify frame priority. Generating video data packets with varying priorities may include separating video data into layers having different resolutions and/or reference points, where the layers may be recombined at a decoder. Higher resolution layers may be treated as having a lower priority.

Video aware HARQ architectures may be implemented for one or both of uplink (UL) and downlink (DL) wireless hops. Video aware HARQ may implement cross-layer control of maximum HARQ retransmissions. A UE may track video packets as they propagate into the wireless protocol stack and/or may specify for each wireless PHY transport block a number of HARQ retransmissions (e.g., a maximum number of HARQ retransmissions) to perform based on video packet priority, for example. A maximum number of HARQ retransmissions may be communicated back to an eNB for example for execution of HARQ processing. A Video aware HARQ architecture may implement LC control of HARQ retransmissions (e.g., maximum retransmissions). A maximum HARQ retransmissions may be determined at an eNB based on a logical channel the instantaneous transport block transmission may be transporting, for example. A maximum HARQ retransmissions may be implemented on both the UL and DL wireless hops, on the UL wireless hop, or on the DL wireless hop.

Hybrid automatic repeat request (HARQ) may provide transmission integrity and/or robustness in wireless communication systems (e.g., an LTE wireless communication system). HARQ may provide physical layer retransmission, for example based on feedback from a receiver using incremental Turbo coding redundancy and/or soft combining.

A soft combining operation may improve HARQ performance, for example because respective information of incorrectly received transport blocks (e.g., blocks with detected errors) may be combined with retransmitted transport blocks that may include an additional amount of redundancy. Combined transport blocks may be detected correctly, for instance without errors.

A maximum number of HARQ retransmissions may be set for one or more associated UEs by the radio resource (RRC) layer, for example. The maximum number of retransmissions may be the number of times a packet may be retransmitted before it is dropped. The maximum number of retransmissions may be set to a constant number (e.g., four) and may be used for at least a portion of a communication session, such as substantially an entirety of the communication session. One or more HARQ processes may be carried out, without regard to variations in a type and/or importance of the data being transmitted, for example.

Video aware HARQ techniques may implement video packet priority information, for example to set a maximum HARQ retransmissions for a transport block transmission. This operation may provide error protection for one or more transmitted video packets.

A video encoder may provide packet priority information. Video encoders, for example H.264, may use a correlation between image frames, for example, to achieve high efficiency and/or high quality compressed video streams. Such compressed video streams may be vulnerable to a number of lost packets, depending on a location of the packet within a correlation scheme, for example. The priority assigned to a video packet may be based on an error propagation effect associated with the video packet and/or based on a perceived degradation of quality of received video associated with the video packet. The priority assigned to a video packet may reflect an impact of error propagation associated with the video packet on received video quality.

Video encoders (e.g., Hierarchical P coding in H.264) may have the capability to construct efficient dependency schemes that may be repetitive and/or may provide packet priority assignments. Hierarchical P coding may be suitable for video conferencing (e.g., video conferencing having substantially low, such as ultra low, delay). Specifying priority for each video packet may depend on, or be based on, a temporal layer of the packet. For example, as depicted in FIG. 2, lower layers may be assigned a priority that is higher than that assigned to higher layers.

Priority for a video packet may be specified based on a distance of the video frame, within a video packet, from an instantaneous decoder refresh (IDR) frame. When using an IPPP picture coding structure with recurring IDR frame insertion, one or more P video frames that are close to an IDR frame may be assigned with respective higher priority levels compared to one or more P video frames that are located further away from the IDR frame.

Figure 3:
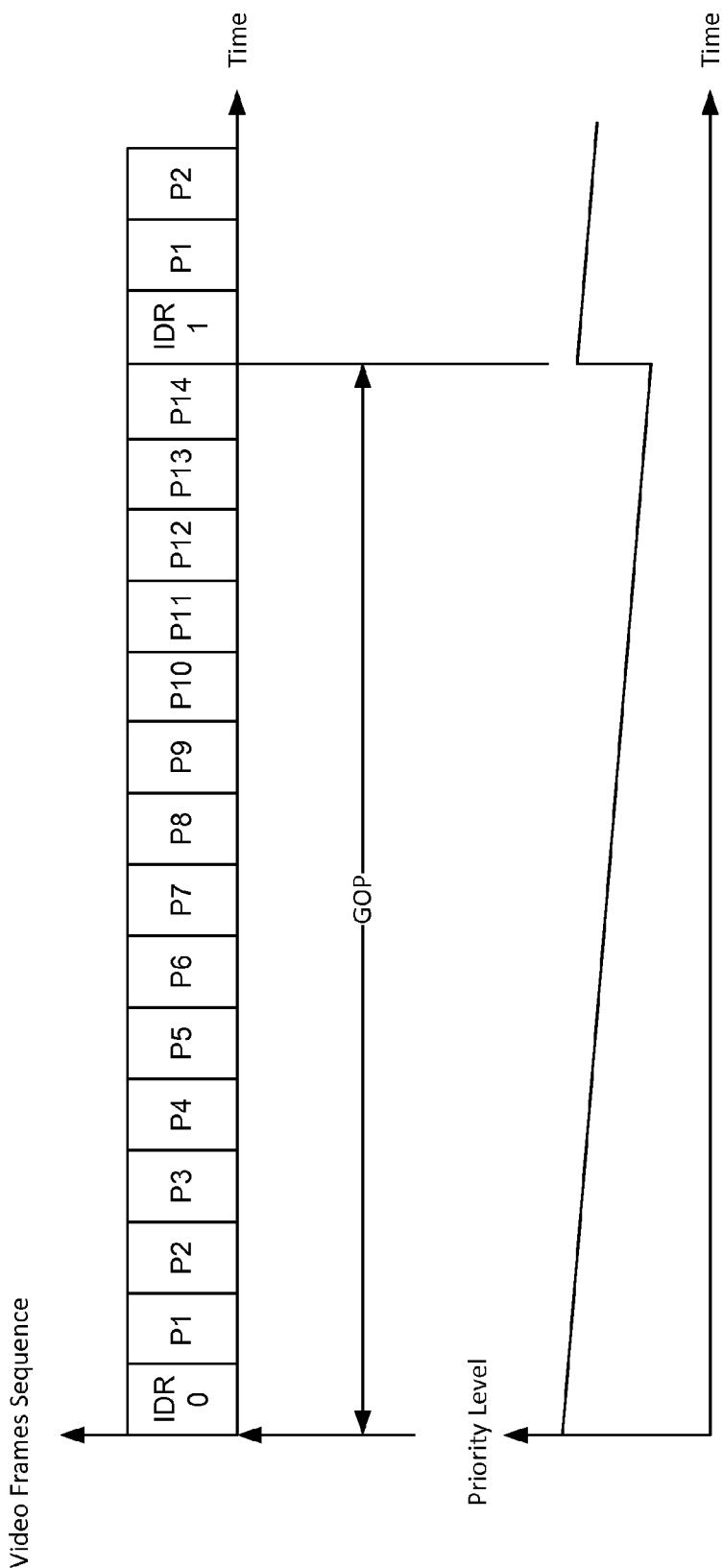
FIG. 3 depicts an example video frame priority based on frame distance from an instantaneous decoding refresh (IDR) frame.

For example, with reference to FIG. 3, the P frames may be numbered P1 through P14, and the respective priority levels may decrease as frame distance from the IDR frame increases. One or more P video frames that are closer to the IDR frame may be given a higher priority than P frames farther from the IDR frame, for example because errors in P video frames that are closer to the IDR frame may generate a higher degree of error propagation. If an error P frame is close to an end of a group of pictures (GOP), for example just before generation of an IDR frame, error propagation may be limited to a few P frames until a next (e.g., subsequent and sequentially following) IDR frame is generated.

Figure 4:
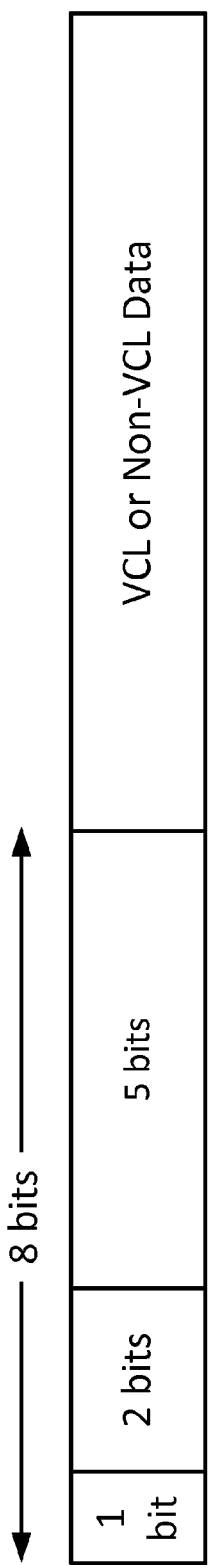
FIG. 4 depicts an example network abstraction layer (NAL) unit format.

Network abstraction layer (NAL) units may be utilized in priority differentiation. For example, in H.264, video output may be in the form of NAL units, and different types of NAL units may be specified by a 5-bit field called NAL Unit Type, including, for example, regular video coding layer (VCL) data, data partition A (DPA), data partition B (DPB), data partition C (DPC), supplemental enhancement information (SEI), sequence parameter set (SPS), picture parameter set (PPS), etc. Additionally, a two-bit field called NAL Ref IDC may specify one or more priorities of NAL Units. A video encoder may specify a priority value in the RefIDC field. A value of 00 may indicate that content of the NAL unit may not be used, for example to reconstruct reference pictures for inter picture prediction. Such NAL units may be discarded without risking an integrity of the reference pictures. Values greater than 00 may indicate that decoding of the NAL unit may maintain the integrity of the reference pictures. NAL unit priority level may be mapped linearly with RefIDC value, for example 00 may represent a lowest priority level and 11 may represent a highest priority level. In a case of hierarchical P with three temporal layers, packets that belong to Layer 1 may be identified by the RefIDC=3, packets from Layer 2 may be identified by RefIDC=2, and packets from Layer 3 may be identified RefIDC=3. An example NAL unit format is depicted in FIG. 4.

Figure 5:
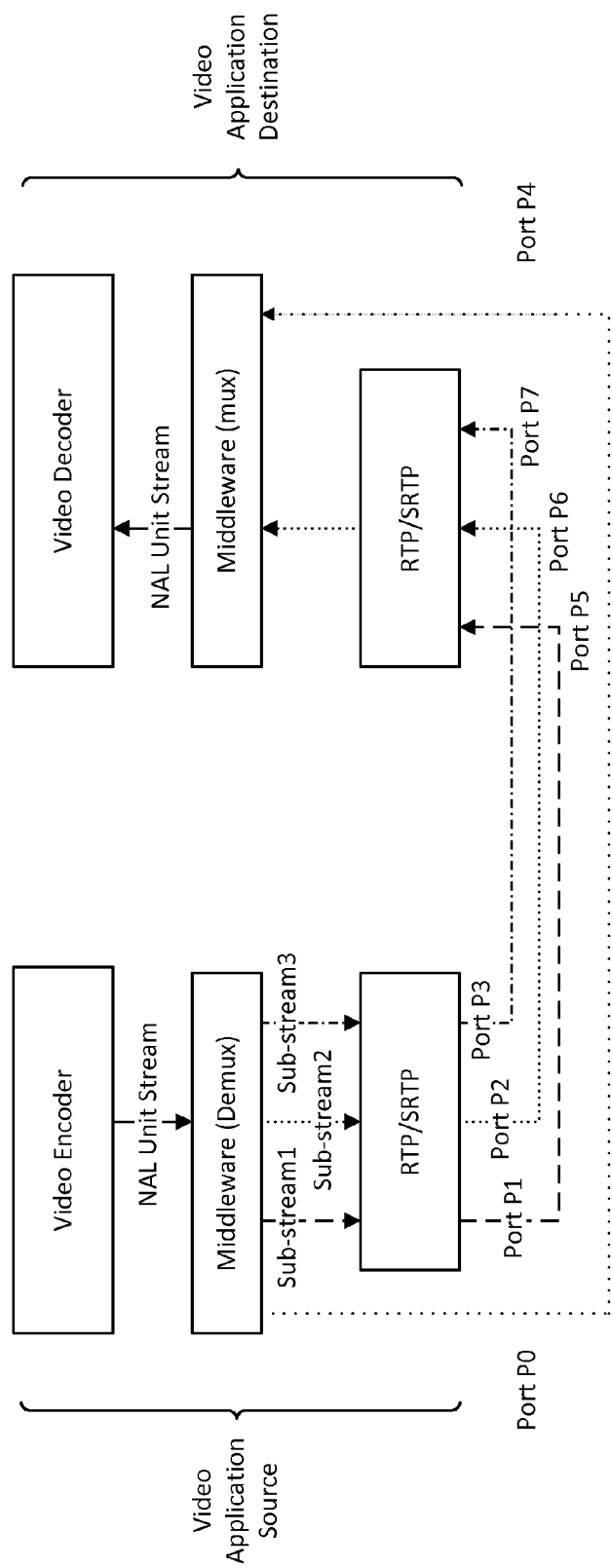
FIG. 5 depicts an example protocol stack video packet separation and merge.

With reference to FIG. 5, when a video application passes NAL Units to real-time transport protocol (RTP), RTP packet format may be used to preserve information on the type of NAL Units. In the RTP packet header, there may be a field called Payload Type (PT), which may be seven bits long. PT values may be assigned (e.g., as in RFC 3551). A video codec may be assigned a PT value (e.g., as in RFC 3551 for H.263). There may be a range of values, for example from 96 to 127, that may be designated as dynamic and/or which may be defined dynamically through a conference control protocol. These values may be used to identify different types of video packets, for example for video codecs such as H.264/AVC. For example, the values may be assigned as follows.

96: H.264/AVC priority NRI=11
97: H.264/AVC priority NRI=10
98: H.264/AVC priority NRI=01
99: H.264/AVC priority NRI=00
. . . .

In accordance with another example, the values may be assigned as follows.

96: H.264/AVC nal_unit_type=5 (IDR)
97: H.264/AVC nal_unit_type=2 (Partition A)
98: H.264/AVC nal_unit_type=3 (Partition B)
99: H.264/AVC nal_unit_type=4 (Partition C)
. . . .

Accordingly, a type of NAL Unit may be exposed in the RTP packet header. When passing RTP packets down to a protocol stack, multiple UDP sockets may be opened. Each UDP socket may correspond to a different type of RTP packet and/or may correspond to a different type of NAL Unit. Each RTP packet may be treated as a whole in an advanced communication system. In such a case, different types of NAL Units may not be mixed in a single RTP packet.

On a receiver side, multiple sub-streams may be merged into a single stream for the video decoder. The receiver UE may merge the RTP packets into a single stream. Splitting of the stream and/or merging of the sub-streams may be carried out, for example, by introducing middleware between the video codec and the RTP and/or by enhancing RTP. When the sub-streams are merged at the receiver, the merged video packets may be out of order. Reordering may be carried out by RTP, for example before video packets are fed to the video decoder. Example functions of separation and merging are depicted in FIG. 5.

Figure 6:
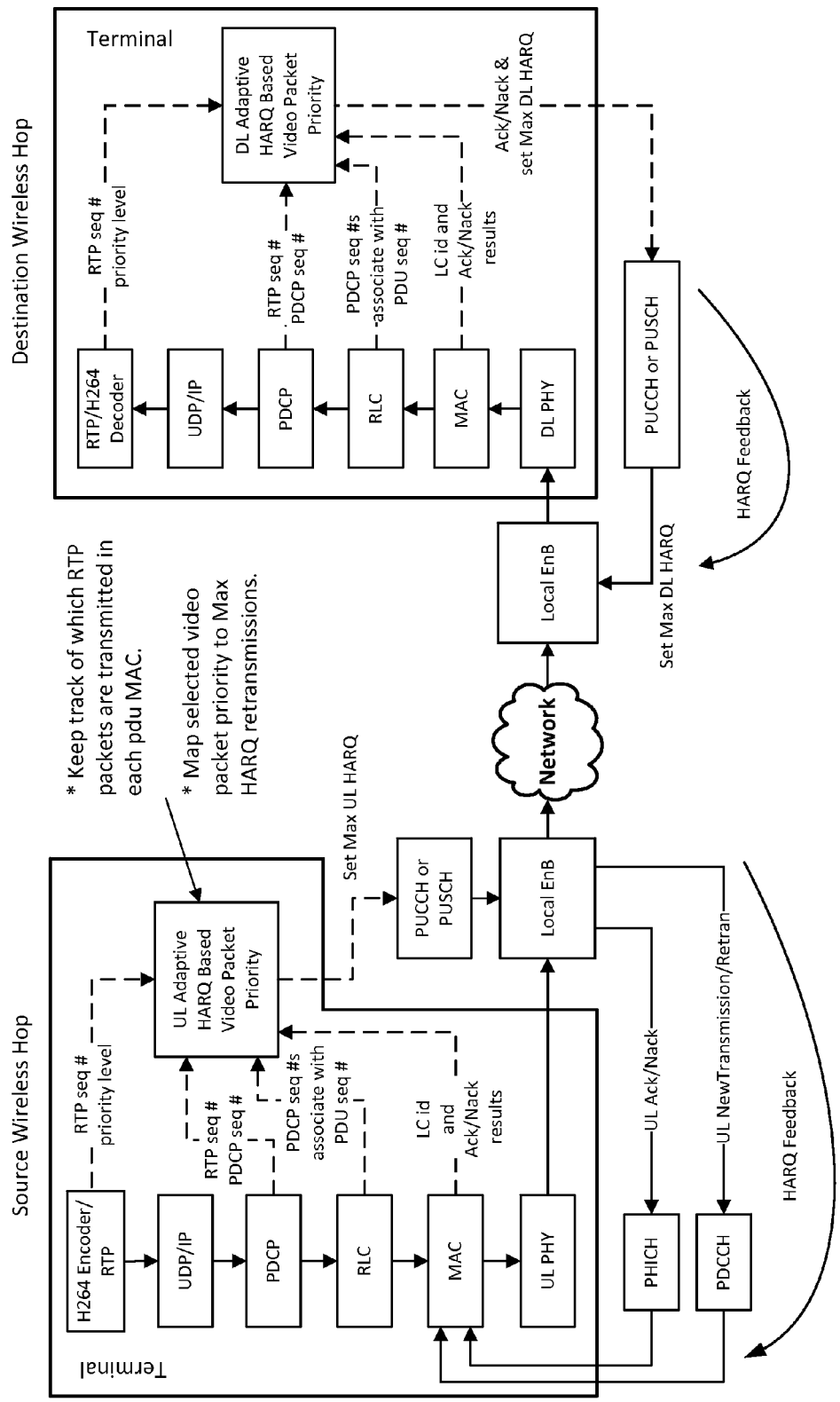
FIG. 6 depicts an example video aware HARQ architecture with cross layer control.

FIG. 6 depicts an example video aware HARQ architecture with cross layer control for maximum HARQ retransmissions. Adaptation of maximum HARQ retransmission of the video packets, for example video packets sent via RTP protocol, may be done independently in a source wireless hop by the source UE and/or in a destination wireless hop by the destination UE. At the source UE, a cross layer HARQ controller may track at least one sequence number associated with one or more RTP packets (e.g., video packets), for example within wireless protocol stack sub layers. This may associate a priority of the RTP packets with one or more MAC protocol data units (PDUs). Packet priorities may be processed in an UL Adaptive HARQ control unit and may be mapped to Maximum HARQ retransmissions. The mapping between RTP packets priorities and maximum HARQ retransmission for a MAC PDU may be affected by an ACK/NACK result of one or more previous transport blocks. The maximum HARQ retransmission may be sent back to the eNB, for example in order to execute a HARQ operation with selected maximum HARQ retransmissions.

The above may be performed in an associated destination wireless hop, wherein one or more previously received RTP packets may be used by a DL adaptive HARQ control unit. For example, a priority of one or more received transport blocks may be predicted and/or one or more received transport blocks may be mapped to an appropriate maximum HARQ retransmissions. The maximum HARQ retransmission may be communicated to the eNB via the PUSCH (Physical UL Shared Channel) and the eNB may carry out the HARQ operation, for instance using the corresponding maximum HARQ retransmissions.

Figure 7:
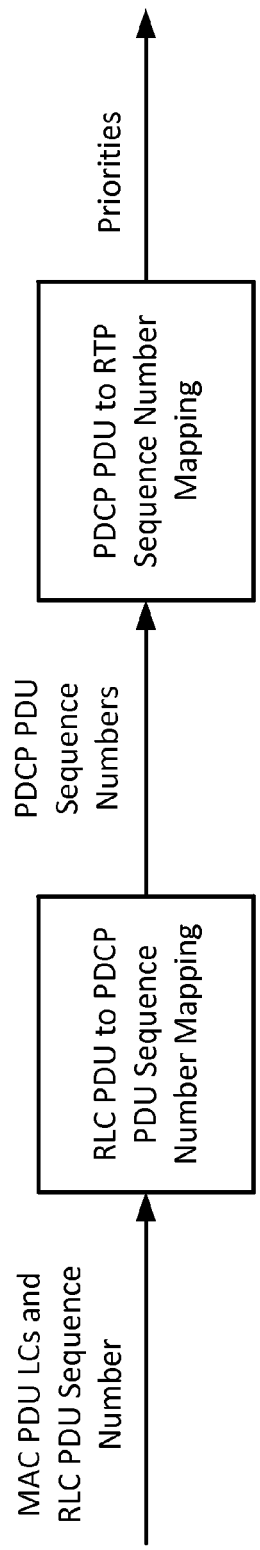
FIG. 7 illustrates an example procedure to identify priorities for one or more media access control (MAC) protocol data units (PDUs).

A MAC PDU priority selection may be implemented by one or more of the following: identifying the logical channels identity and/or RLC PDUs sequence numbers associated with each MAC PDU; or using packet tracking tables as described herein (e.g., as depicted in FIG. 7). An RTP packet sequence number to PDCP PDU sequence number (e.g., mapped one to one) mapping table may be implemented. The system may track the PDCP sequence number (e.g., rather than using deep packet inspection in the lower layers) due to encryption of the payload (e.g., where the RTP sequence number is part of the PDCP payload) in the PDCP layer. A PDCP PDUs sequences number to RLC PDU sequence numbers mapping table may be implemented. RLC PDUs may have multiple PDCP PDUs and the PDCP PDUs may be segmented, for example to fit MAC service data unit (SDU) size. A mapping table may identify identities of logical channels and RLC PDUs sequence numbers that may be included in an instantaneous MAC PDU.

Figure 8:
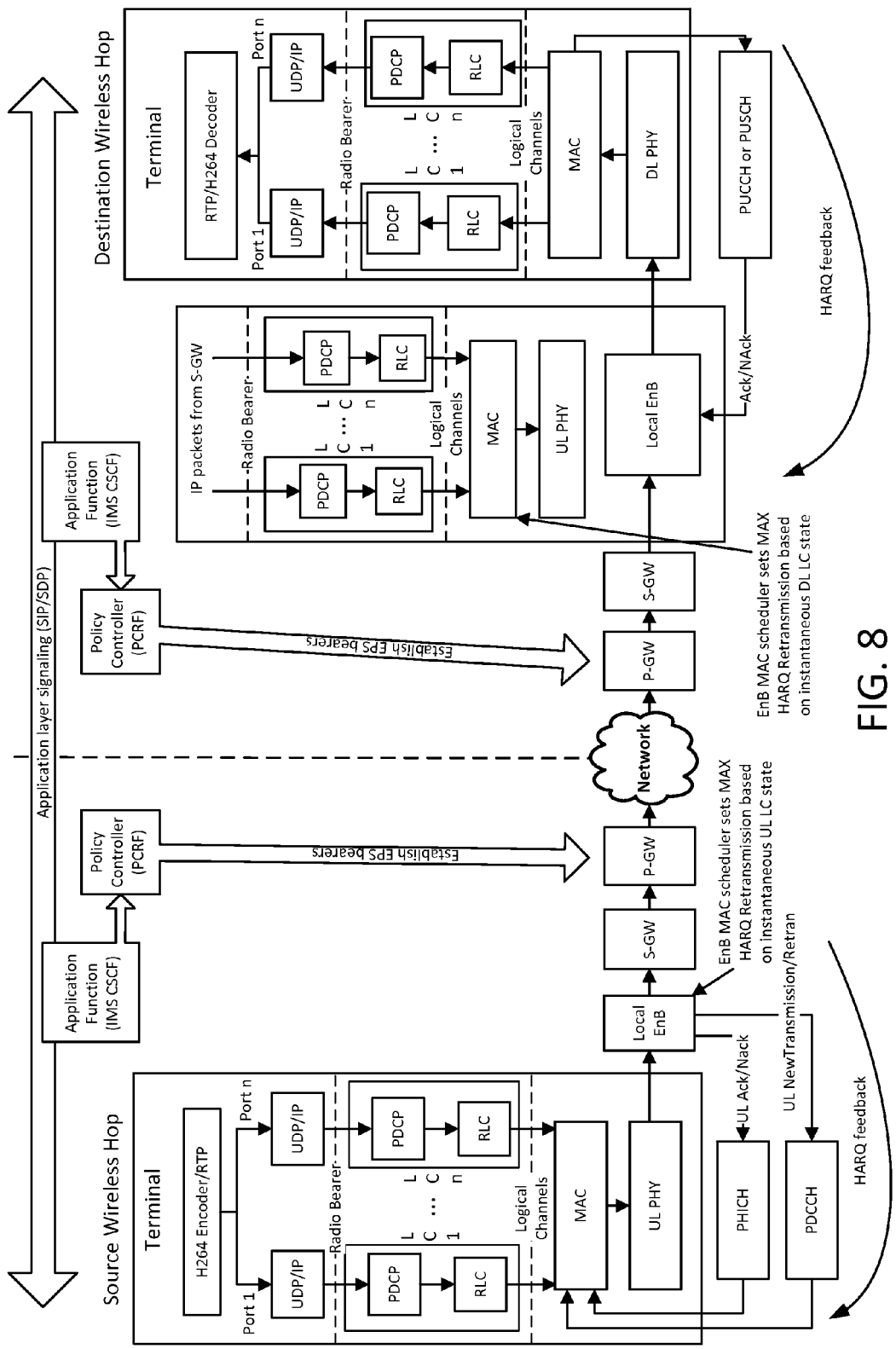
FIG. 8 depicts an example video aware HARQ architecture with logical channel control in accordance with a wireless end-to-end approach.

FIG. 8 depicts an example video aware HARQ architecture with logical channel control for maximum HARQ retransmissions in accordance with a wireless end-to-end approach. One or more evolved packet system (EPS) bearers with assigned quality of service (QoS) may be established on one or both of the source and destination wireless hops, for example respectively, for instance to transport video data application, for example, via the wireless networks. The QoS class of EPS bearers may be set up to support different levels of video packet priorities, for example, generated by the video encoder or otherwise generated, for instance in association with packet inspection. The EPS bearers may be mapped one to one to logical channels. Each logical channel may belong to a different QoS group with different priority, for example in accordance with an initial setup of the EPS bearers (e.g., LC1—highest priority, LCn—lowest priority). The video packets generated by the video encoder in the source UE may be directed to the different logical channels, for example to match an LC priority with a video packet priority.

Figure 9:
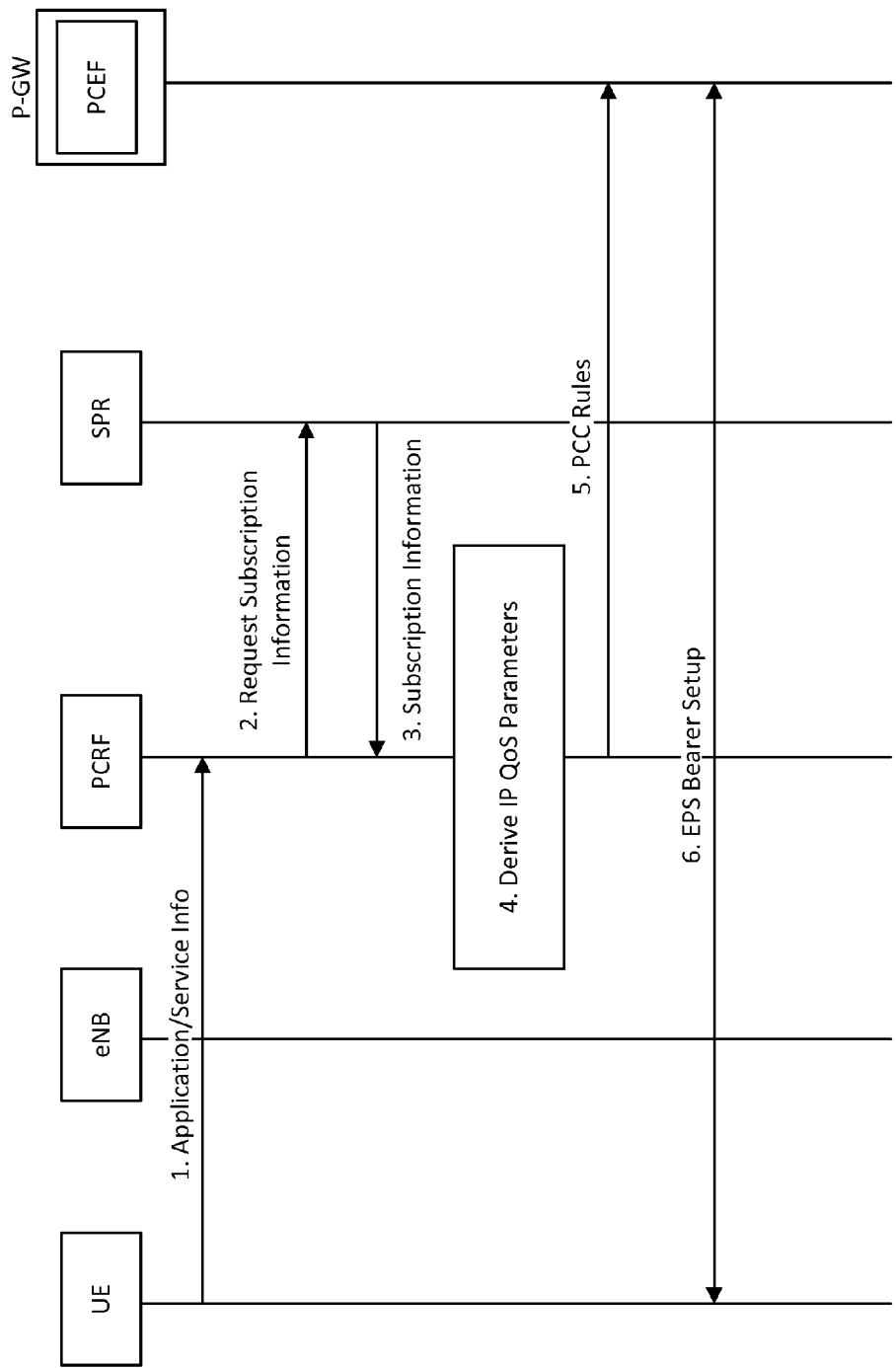
FIG. 9 illustrates an example process leading to an evolved packet system (EPS) bearer setup.

In a destination wireless hop the DL EPS bearers may be established similarly to the source wireless hop, for example with the control of IMS PCRF (IP multimedia service Policy and charging rules function). The video packets that reach the destination eNB via its EPS bearers may be mapped to corresponding logical channels, for example in accordance with respective original EPS bearers at the source wireless hop. The destination wireless hop eNB may set the maximum HARQ retransmissions for the video packets associated with one or more specific logical channels according to a logical channel QoS priority setup in the course of establishing the EPS bearer. As a result of EPS bearer differentiation at a destination wireless hop, packets originated with high priority from the source wireless hop (e.g., a UE video encoder in the source wireless hop) may experience a large number of maximum HARQ retransmission at the destination wireless hop. The above may prioritize a scheduler to send higher priority packets that may be waiting in a queue first and to subsequently send lower priority packets that may not have reached respective delay limits. FIG. 9 illustrates an example process leading to an evolved packet system (EPS) bearer establishment in source and destination wireless networks, respectively.

Figure 10:
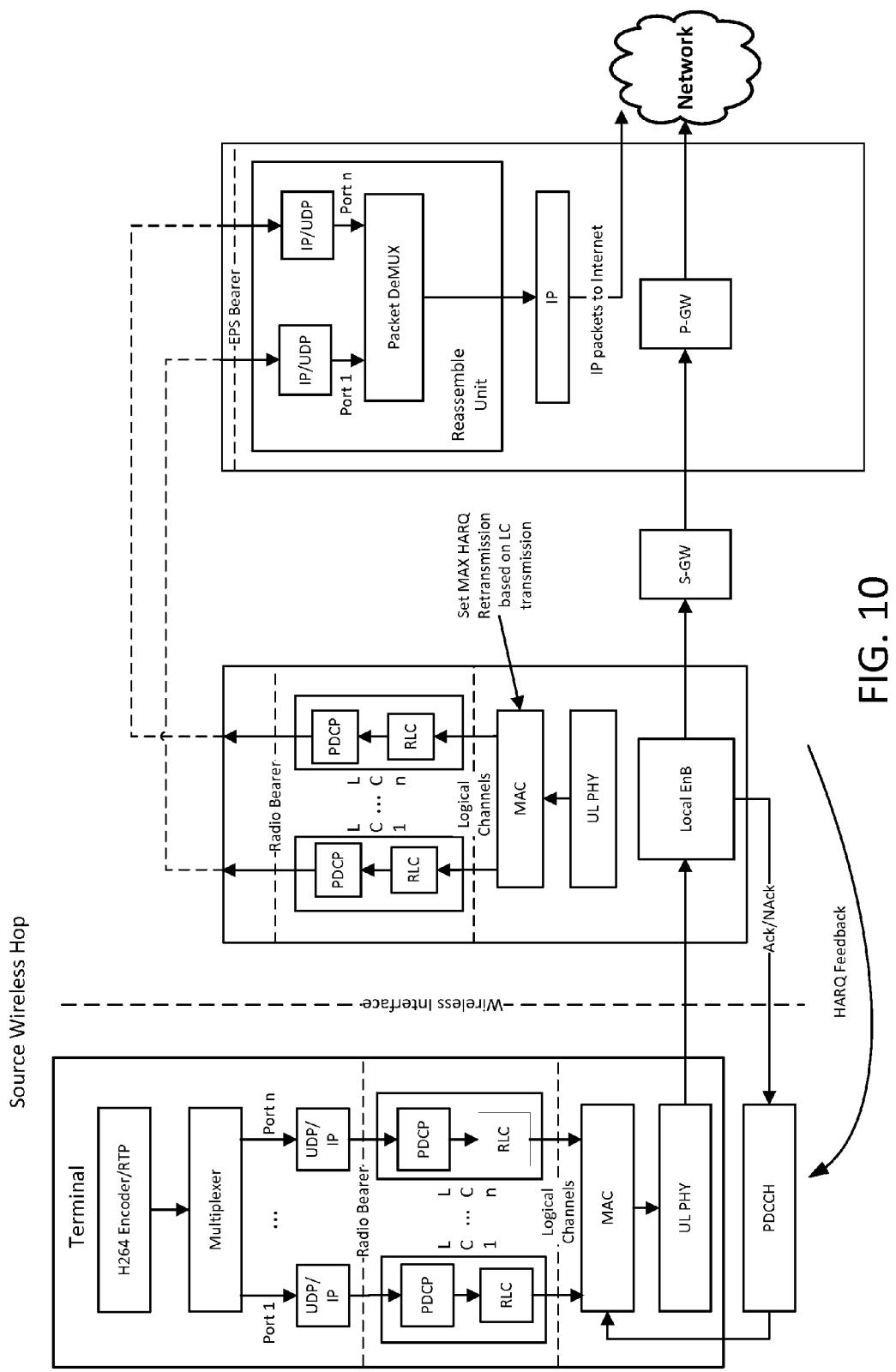
FIG. 10 depicts an example video aware HARQ architecture with LC control and reassembling in accordance with an independent source wireless hop approach.

FIG. 10 depicts an example video aware HARQ architecture with LC control and reassembling in accordance with an independent source wireless hop approach. For example, in a video conferencing system with an independent source wireless hop, the UE may request a policy and charging enforcement function (PCEF), for example via PCRF, to establish multiple EPS bearers, for example, to improve (e.g., optimize) the video experience. The UE may multiplex one or more packets with different respective priorities into multiple sub streams that may be identified by UDP port number and may be mapped to different LTE radio bearers to be transmitted to the eNB via the LTE protocol stack, for example. A scheduler (e.g., a MAC scheduler in the eNB) may utilize the LC priority and buffer status to specify the maximum HARQ retransmission used for each TTI. The video packets may be transported to a packet data network gateway (P-GW), merged into a single stream, and sent to the destination user.

Figure 11:
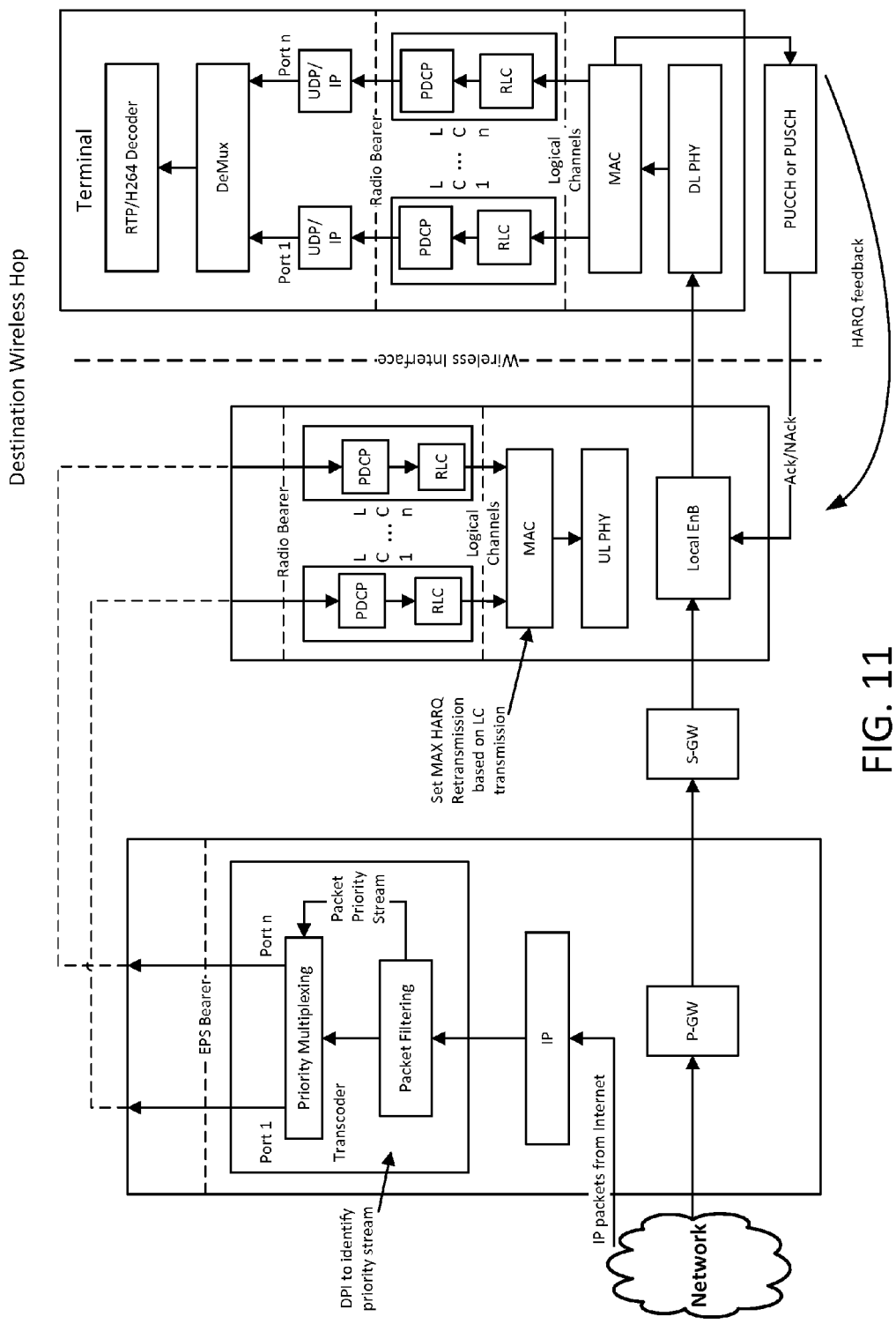
FIG. 11 depicts an example video aware HARQ architecture with LC control and reassembling in accordance with an independent destination wireless hop approach.

FIG. 11 depicts an example video aware HARQ architecture with LC control and reassembling in accordance with an independent destination wireless hop approach. For example, in a video conferencing system with an independent destination wireless hop, the video aware HARQ control may be located at the destination eNB. The source user may encode the video packets and may communicate the respective packet priorities as different UDP port numbers to the destination wireless network. At the destination wireless hop, the P-GW may perform packet filtering and may map the different video packets to multiple EPS bearers, for example according to the respective UDP port numbers. The LTE eNB may map video packets that are assigned to the different radio bearers to their corresponding LCs. The eNB scheduler may specify (e.g., assign) the maximum HARQ retransmissions for each transport block, for example according to respective data origin local channel ID (LCID) and LC buffer status. The video packets may be transported to the UE, merged into a single stream, and sent to the destination video decoder application. Packet reordering at the UE may be performed by RTP using packet sequence numbers and packet time stamps, for example.

Protocol changes, such as LTE protocol changes, may be provided to support adaptive maximum HARQ retransmissions. A UE HARQ entity may be configured by the E-UTRAN using an RRC protocol with the parameter maxHARQ-Tx that specifies a maximum number of HARQ retransmissions, for example. Control of UL HARQ operation may be performed by an associated eNB. When a PDCCH for the UE is correctly received, and in some instances regardless of the content of the HARQ feedback (ACK or NACK) from the eNB, the UE may follow instructive indications from a PDCCH, for example to perform a transmission or a retransmission. Use of maxHARQ-Tx by the UE may be limited to the case where the PDCCH is not received to instruct the UL HARQ activity.

In video aware HARQ, information of video packet priority may be limited to existence in the UE side (e.g., the UE). The UE may convey the information to an associated eNB. This may allow the eNB to control Max HARQ retransmissions, for example based on identified UE packet priority carried by one or more corresponding transport blocks.

Modifications may be made to one or more protocols (e.g., LTE protocols) that may be used to support video aware HARQ operation. For example, in video aware HARQ with cross layer control, information pertaining to video packet priority may exist only in an associated UE. Therefore, the UE may map the video priority into Maximum HARQ retransmissions and may communicate the information to the eNB. The eNB may use the information to schedule retransmissions and/or to generate transmissions.

Described herein are modifications that may be carried out on one or more protocols (e.g., LTE protocols) in order to support video aware HARQ with cross layer control.

Figure 12:
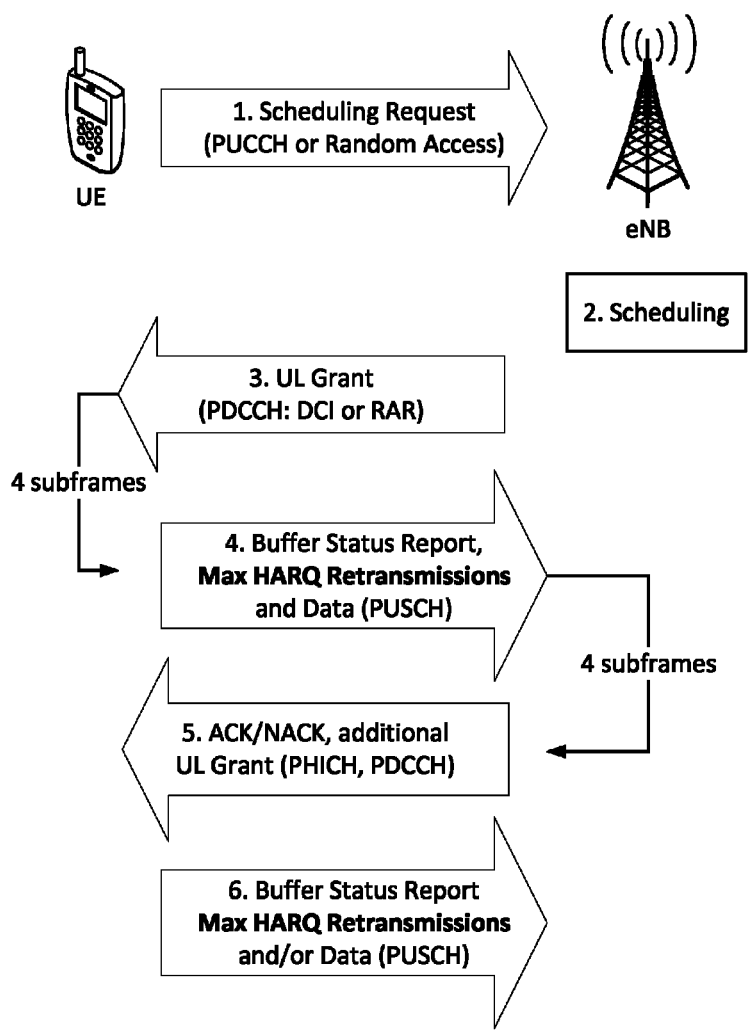
FIG. 12 illustrates an example message flow exchange that may support video aware HARQ in LTE UL.

In an UL source wireless hop, a message may be added to convey the MAX HARQ retransmission from the UE to the eNB. The MAX HARQ message may be communicated via the PUSCH, for example in a MAC PDU that may include a buffer status report (BSR) message. An example LTE protocol exchange and additional definition to support video aware HARQ may be shown in FIG. 12.

Figure 13A:
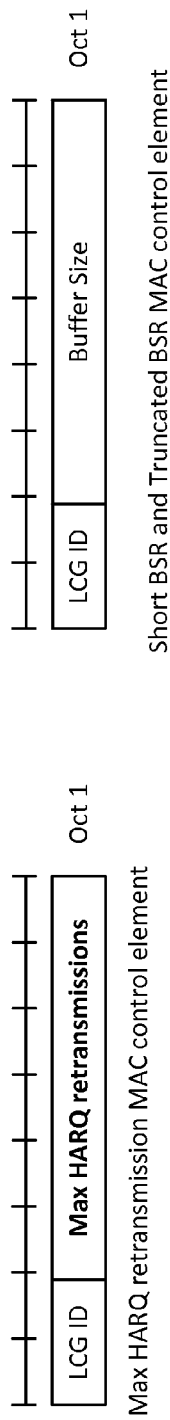
FIGS. 13A-13C depict examples of MAC PDUs including Max HARQ retransmission MAC control elements.
Figure 13B:
Figure 13C:
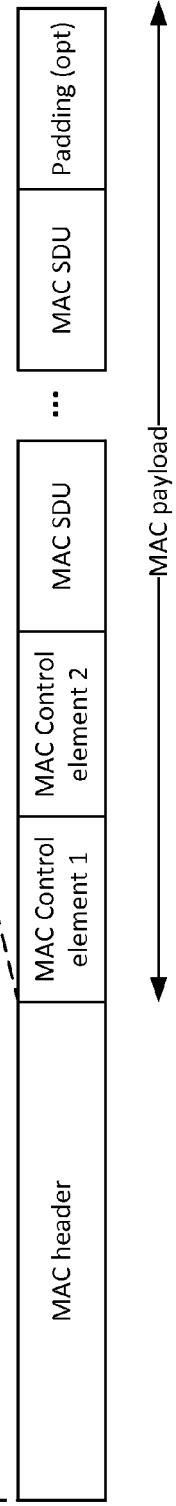

FIGS. 13A-13C depict examples of MAC PDUs including Max HARQ retransmission MAC control elements.

Figure 14:
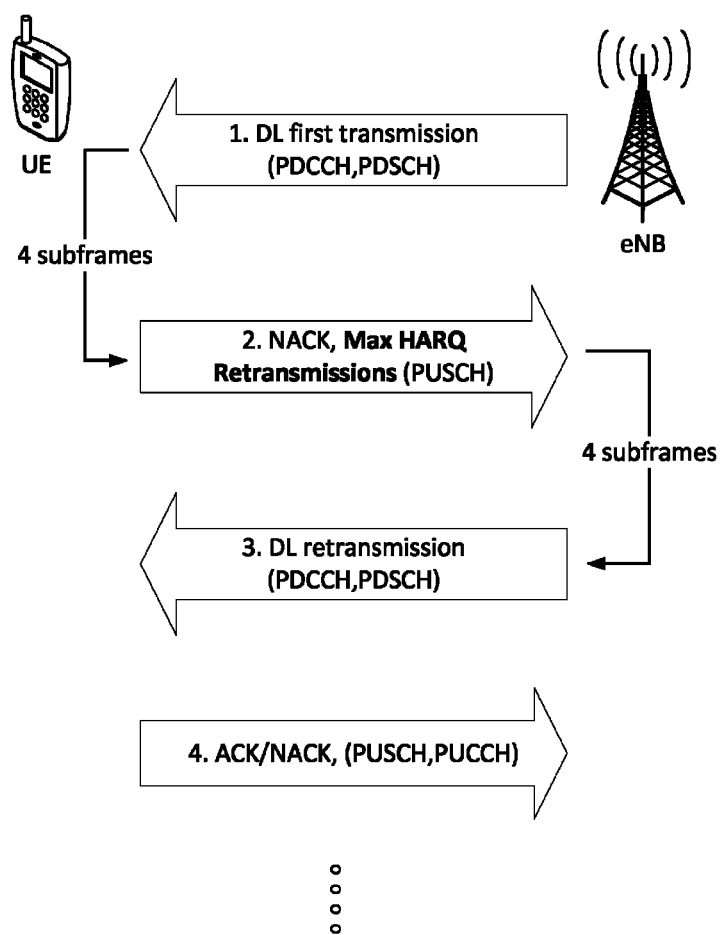
FIG. 14 illustrates an example of MAC DL Max HARQ retransmission control feedback with first transmission NACK feedback.

In a DL destination wireless hop, a UE may get priority information from the application layer about past received packets and may predict the priority of one or more subsequently received packets. The UE may inform the eNB of the max HARQ retransmissions recommended for one or more transport blocks (TBs), for example by including the MAX HARQ retransmissions, for example, with a first NACK feedback transmission. This particular message sequence may provide an association between the MAX HARQ retransmission message and a TB HARQ process identity. If PUSCH is not scheduled during a first transmission of NACK, or MAX HARQ retransmission is not received, the eNB may use a default maximum number of retransmissions for one or more TBs. FIG. 14 illustrates an example sequence including MAC DL Max HARQ retransmission control feedback with first transmission NACK feedback.

Figure 15:
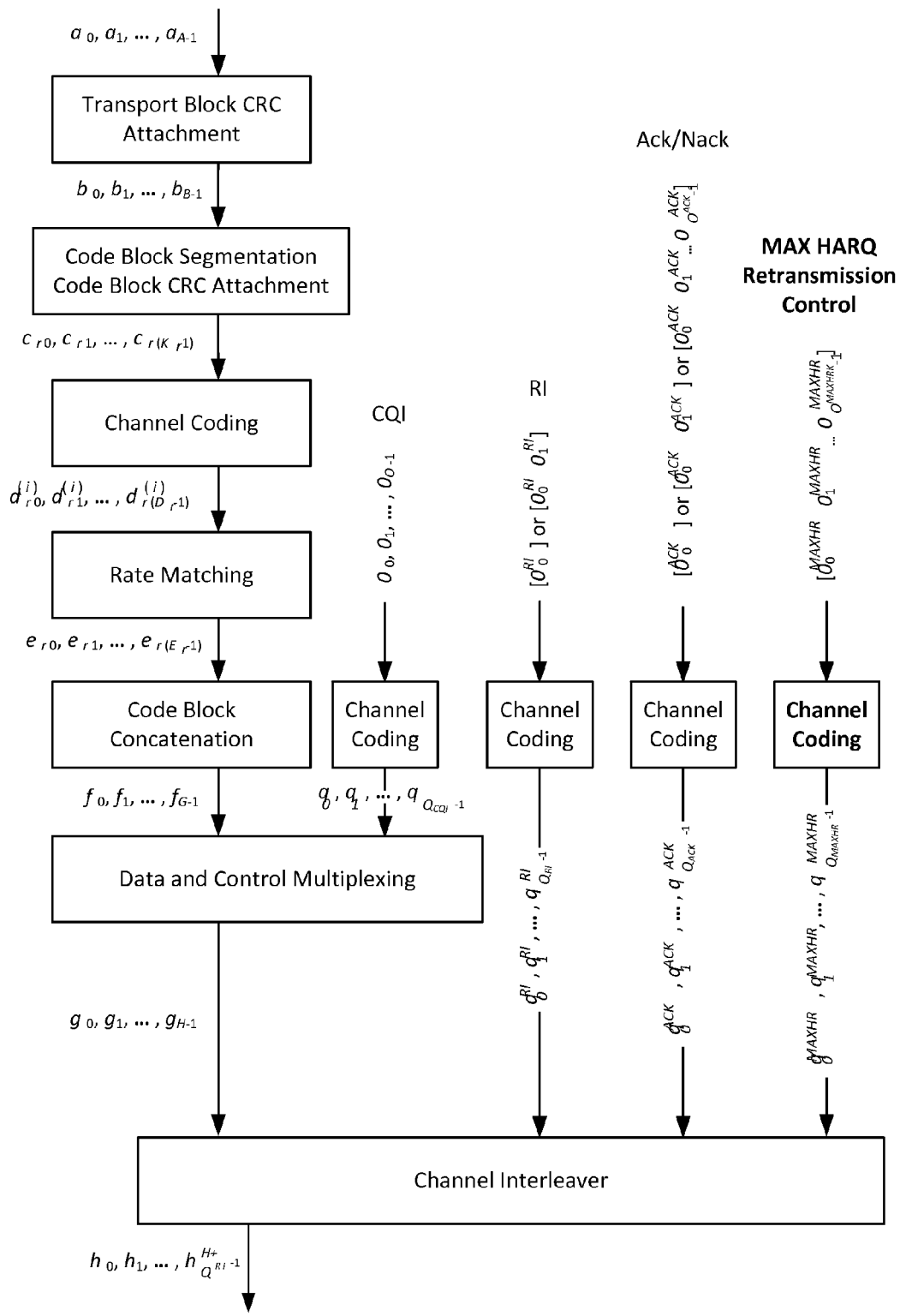
FIG. 15 illustrates an example of transport channel processing for an uplink shared channel (UL-SCH) having Max HARQ retransmission control.

FIG. 15 illustrates an example of transport channel processing for an UL-SCH that supports MAX HARQ retransmission control. A channel interleaver, in conjunction with a resource element mapping for PUSCH, may implement a time-first mapping of modulation symbols onto a transmit waveform. Max HARQ retransmission control bits may be added to the channel interleaver to be treated similarly to ACK/NACK and/or RI bits.

A video aware HARQ architecture with logical channel (LC) control may establish one or more EPS bearers, such as a plurality of EPS bearers for a single video application. The different EPS bearers may be characterized by different respective QoS for different priorities of video packets. Different QoS may be specified by a QoS Class Index (QCI) characteristic table, for example with limited options for QoS classes. In order to support multiple video applications mapped to multiple LC, the QCI table may be extended. When using multiple LC for a single video application, the video packets may be separated at the video source (e.g., the UE at the source wireless hop) and then merged back with the proper order in the destination (e.g., the UE at the destination wireless hop). One or more split and merge processes may be done at the UE, for example assuming both UEs use a compatible operation.

In order for the eNB to specify a correct value for MAX HARQ retransmissions for each LC, a UE (e.g., a source UE) may inform the eNB of a number of MAX HARQ retransmissions for each LC. The UE may determine a desired value for MAX HARQ retransmissions, for example in accordance with a serving LC priority. The UE may communicate (e.g., transmit) the desired MAX HARQ retransmission value to a network device associated with the UE (e.g., an eNB). The UE may inform the eNB of select LCs that belong to the single video application. The eNB may specify the MAX HARQ retransmission, for example in accordance with different LC QCI values that belong to the single video application.

Figure 16:
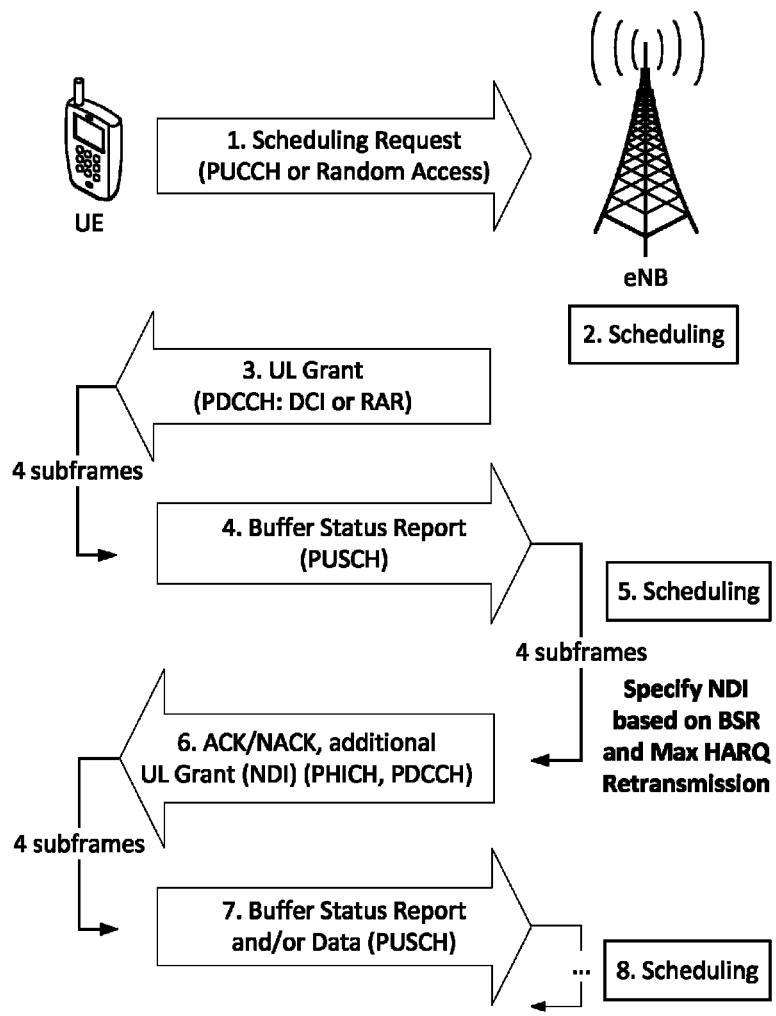
FIG. 16 illustrates an example message exchange with video aware HARQ in LTE UL.

In a UL video aware HARQ architecture with LC control, information pertaining to video packet priority may be passed from a UE to an associated eNB (e.g., implicitly), for example via a LCID field in a BSR message. When video packets arrive at the UL LTE stack, the MAC layer may generate a buffer status report (BSR) that may provide support for QoS-aware packet scheduling and/or selection of the Maximum number of HARQ retransmissions. FIG. 16 illustrates an example protocol exchange for LTE UL transmission from the UE to the eNB. Video aware HARQ operation may be performed in 5 and 8, where the scheduler may decide whether to perform additional retransmissions based on one or more BSR values, for example, that may implicitly indicate the packet priority of one or more respective following transmissions.

Figure 17A:
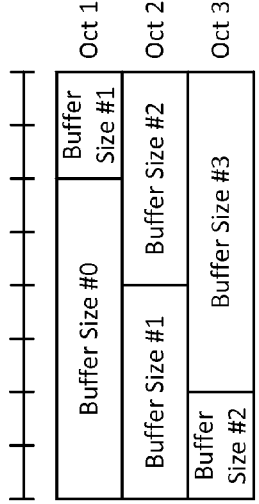
FIGS. 17A-17C depict an example BSR and MAC PDU structure.
Figure 17B:
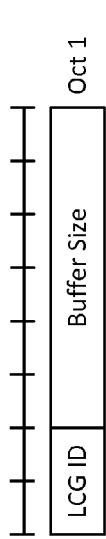
Figure 17C:
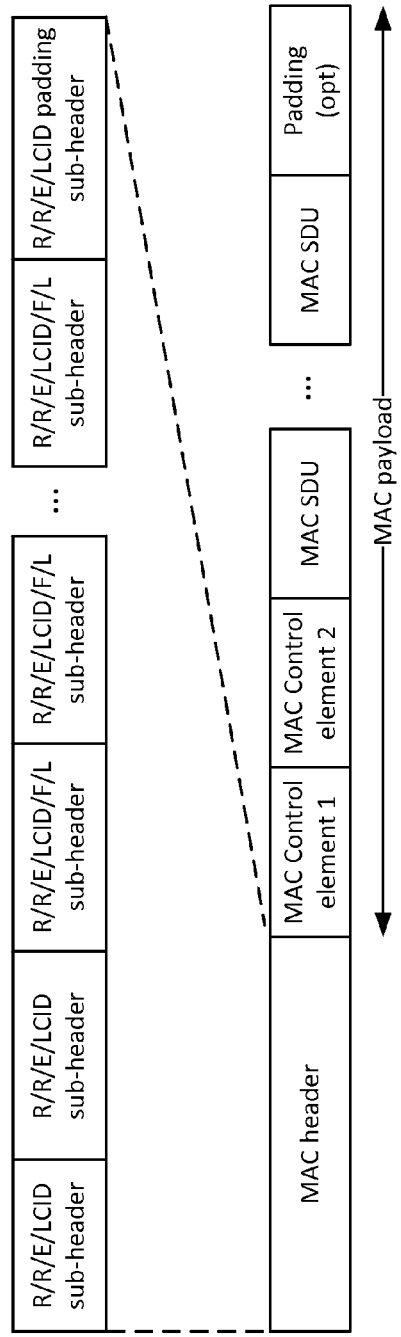

An LTE BSR mechanism may include two phases (e.g., triggering and reporting). BSR triggering may occur periodically, for example based on timer expiration or when uplink data arrives in a UE transmission buffer and the data belongs to a logical channel group with higher priority than that of data already in the UE transmission buffer. BSR reporting may be performed via a MAC control element (CE), for example when the UE is allocated resources on the PUSCH in a TTI and a reporting event is triggered. At least two BSR formats may be used: Short BSR, wherein one LCID is reported if there is data from one LCG group; and/or Long BSR, wherein four logical channel groups may be reported when data is present in more than one radio bearer group and/or the BSR MAC CE fits in the allocated transport block size. FIGS. 17A-17C depict an example MAC PDU structure and an example BSR structure as part of a MAC CE.

In DL video aware HARQ with LC control information, video packet priority may be conveyed to an associated eNB, for example via a P-GW by mapping the video packets into different EPS bearers which may be passed to the eNB, for example via corresponding S1 bearers. The DL MAC scheduler located at eNB may have substantially complete information about the DL buffer occupancy assigned to each LC and may control the maximum HARQ retransmissions, for instance on a per transport block (TTI) basis.

Figure 18:
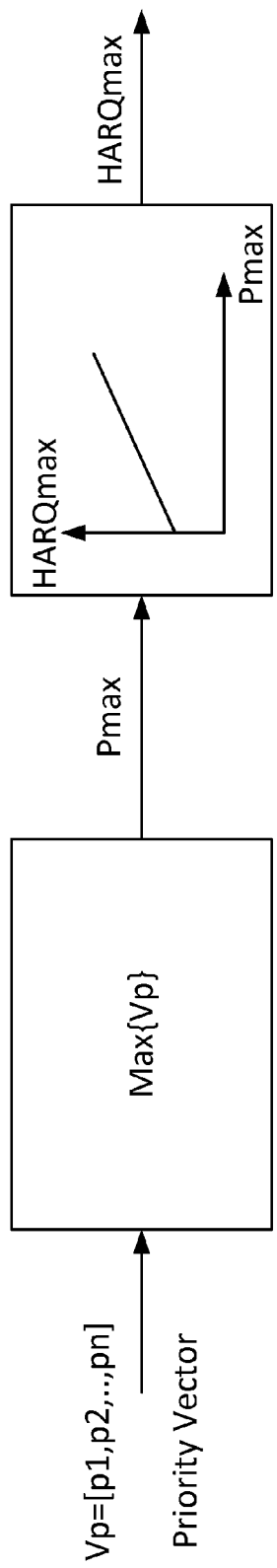
FIG. 18 depicts an example mapping function from a plurality of MAC SDU priorities to multiplexed MAC PDU max HARQ retransmissions.

Respective MAC SDUs from multiple LCs may be multiplexed into a single MAC PDU as depicted in FIG. 18. Each SDU may represent one or more packets assigned to a single LC with corresponding priority. Each PDU may have a single maximum number of HARQ retransmissions associated with it, and the multiple MAC SDU priorities may be mapped into a single maximum number of HARQ retransmissions at the MAC scheduler for both UL and DL. FIG. 18 illustrates a mapping function between a vector of priorities representing the multiple MAC SDUs mapped to single MAC PDU, and a maximum number of HARQ retransmissions selected in a TTI. The HARQmax value may represent the maximum number of HARQ retransmissions, for example for the highest priority multiplexed SDU in the TTI.

As described herein, the use of multiple EPS bearers with associated QoS parameters for a single video application may involve extending a QCI table to accommodate multiple logical channels that may have different priorities.

A limited EPS bearers differentiation, in order to carry the multiple video streams, may be achieved by using QCI values for different services, with appropriate PER, delay, and priority. For example, using QCI=1 for low priority and QCI=2 for high priority. QCI=1 may indicate PER=$10^{-2}$ and QCI=2 may indicate PER=10^-3. Any other suitable combinations may be implemented, for example when QOS characteristics are met.

Support of multiple EPS bearers without changing the QCI table may be achieved by establishing multiple EPS bearers with the same QCI value and differentiation between the EPS bearers may be performed, for example at an E-UTRAN over the air by setting the appropriate priority parameter in LogicalChannelConfig information element setup by RRC protocol. The 'priority' parameter may be set by the E-UTRAN, for example in accordance with an EPS bearer QoS and/or a traffic flow template (TFT), which may indicate what type of applications should run over them. The priority parameter may be used in the UE UL MAC scheduler to prioritize LCs once the UE is granted (e.g., the smaller the value the higher priority).

Figure 19:
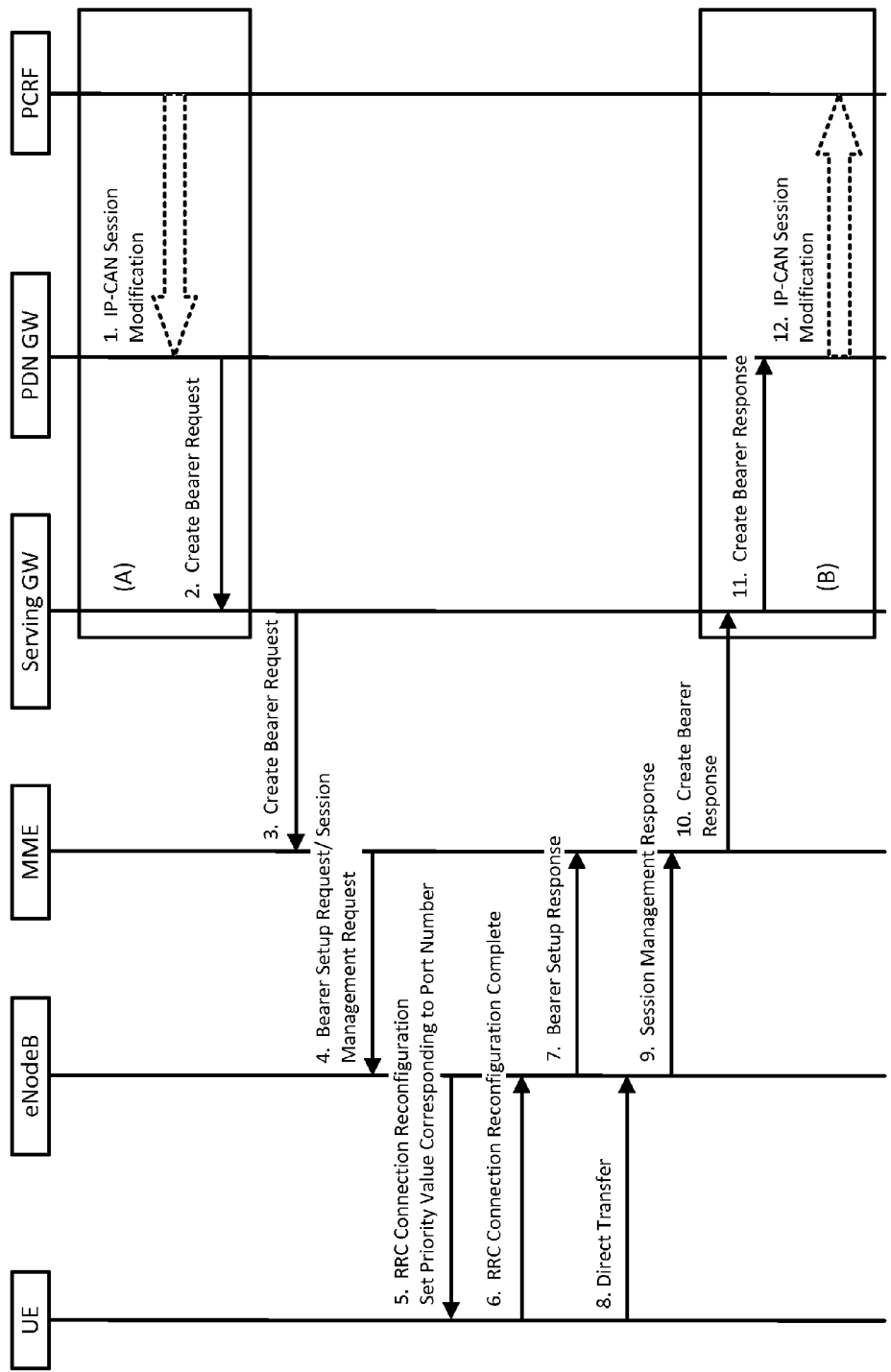
FIG. 19 illustrates an example dedicated bearer activation procedure.

FIG. 19 illustrates steps for an example dedicated EPS bearer activation procedure. As part of the RRC connection configuration step 5 the eNodeB may configure the priority parameter in the LogicalChannelConfig information element to an appropriate priority, for example in accordance with a video stream relative priority. The identification of radio bearer priority corresponding to a particular video sub stream may be performed by identifying the associated EPS bearer level TFT, which may indicate what type of application should run over them, and the TCP/UDP port number which may be part of the TFT. TFT information may be included in the ACTIVATE EPS BEARER CONTEXT REQUEST message and may be passed from an MME to a UE, for example via an eNB. The eNB may perform deep packet inspection, may identify a port number associated with the EPS bearer, and/or may map the port value into a radio bearer priority. The mapping of the EPS bearer identity associated with TFT into radio bearer priority (e.g., logical channel priority) may be performed by a network provider.

When a video call (e.g., a video conference) is initiated between two mobile devices (e.g., two UEs) via two public mobile networks and one of the mobile networks does not support prioritization of multiple video sub streams, a proprietary approach may not provide performance gains. Wireless networks that do not support multiple video sub stream prioritizations may deliver video via multiple EPS bearers mapped to radio bearers with the same priority. Gain in this scenario may depend on a congestion state of the non-supportive network.

An example video aware HARQ technique may combine two operations: separation of video packets into multiple EPS bearers and corresponding logical channels according to video packet priority; and adaptation of a MAC PDU maximum HARQ retransmission according to a MAC SDU associated logical channel priority.

Figure 22:
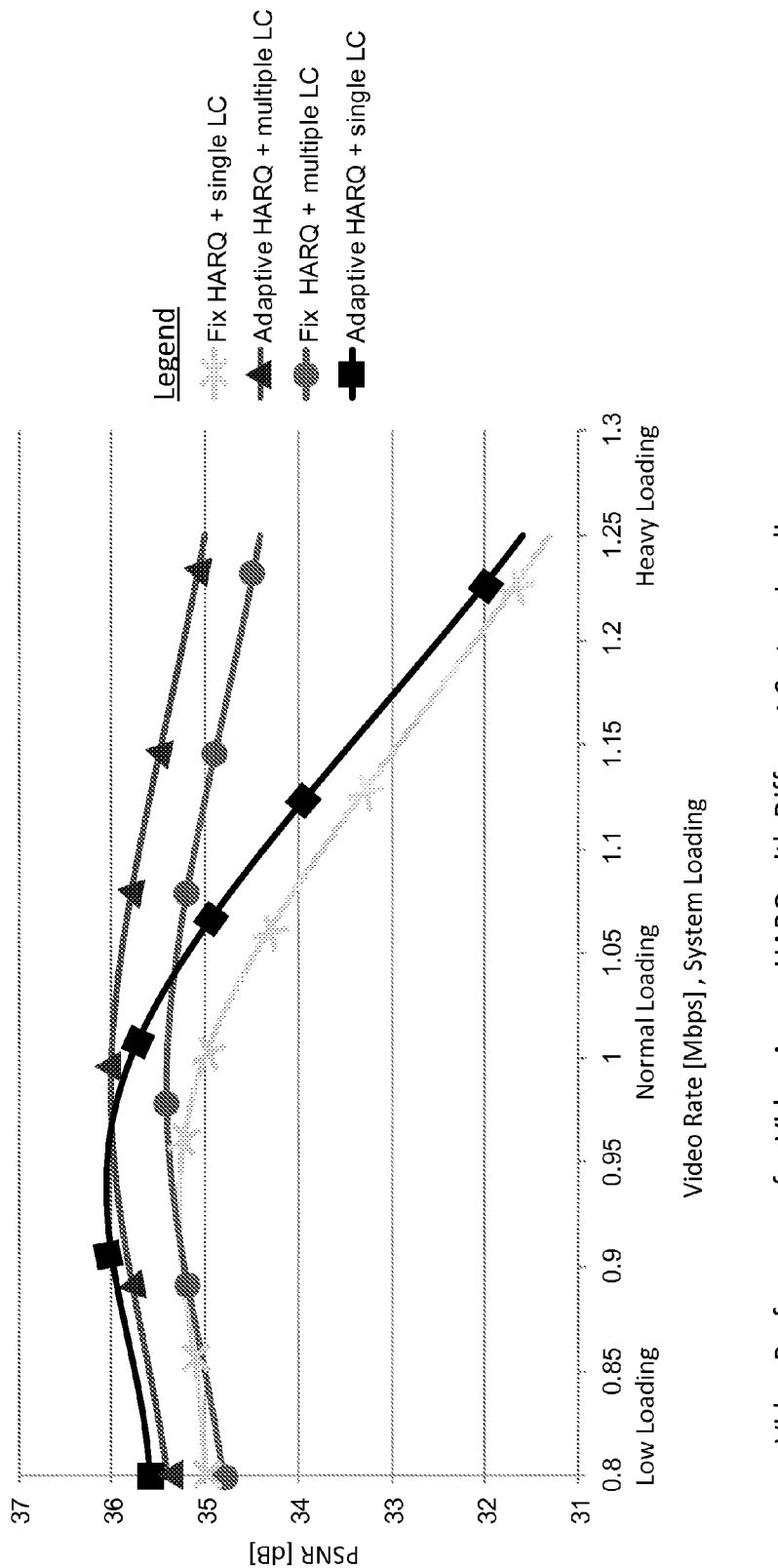
FIG. 22 is a plot illustrating video application average UE performance in respective example loading conditions.

As illustrated in FIG. 22, video quality gain may be achieved without adaptation of HARQ when the wireless system is under heaving loading, for example by performing differentiation of video packets and/or mapping the packets into multiple EPS bearers (LCs). A scheduler may utilize the established multiple LC prioritization to schedule packet transmissions with higher priority first, followed by lower priority packets. Due to reordering of packets from different video sub streams with different priority by the scheduler, reordering may be done by RTP, for example before the video packets are fed to the video decoder. When congestion occurs, the packets with lower priority may have a higher probability of being dropped since the packets may be waiting longer in the queue for transmission and may experience more transmission timeouts. Packets with high priority may be transmitted first, such that the high priority packets may experience a lower probability of packet drop due to transmission timeout.

A video aware HARQ architecture with cross layer control architecture may include a Max retransmission schema that may be adapted, for example based on one or more performance indicators (e.g., past ACK/NACK signals may indicate correlation in the wireless channel). This may be performed by communicating the Max retransmission substantially instantaneously with each transmission, so as to allow substantially unlimited max retransmission options. Selection of the Max retransmission may be performed based on an indication of one or more video packets (e.g., all video packets) that may be carried by the MAC PDU. Reordering of the packets may not be performed before video decoding, for example if packets may be sent via a single LC so as to arrive in order.

A video aware HARQ architecture with LC control may not include instantaneous signaling of Max HARQ retransmission from a UE to an associated eNB. The max HARQ retransmissions may be signaled during a session initiation for each logical channel (e.g., similarly to implementing QoS using multiple LCs). The above-described Max retransmission control may be applied to one or both of an UL and a DL.

Use of one or more logical channels to differentiate video packets with different respective priorities may be implemented. For example, video packets with different respective priorities may be reordered in a queue by a scheduler (e.g., a MAC scheduler), where higher priority packets may be scheduled for transmission first with larger Max HARQ retransmissions, followed by lower priority packets with smaller Max HARQ retransmissions. More than one queue may be implemented (e.g., a first high priority queue and a second low priority queue). A scheduler (e.g., a MAC scheduler) may monitor the first and second queues and may allocate packets for transmission from one or both of the first and second queues, for example in accordance with a policy associated with the scheduler. The scheduler may cause one or more packets waiting in the high priority queue to be transmitted before one or more packets waiting in the low priority queue, even if the one or more packets in the low priority queue were generated first and/or have not reached respective delay limits. The high and low priority queues may each be associated with different respective logical channels.

Performance evaluation may be performed based on a simulation of a video aware HARQ architecture with cross layer control. An example system simulation structure may include integration of a DL multi user system simulation, packet data flow simulation and video encoders and/or decoders for each user. The DL system simulation may perform simulation of a PHY layer and/or a MAC layer scheduler. Data flow simulation may emulate RLC operation and the interface between a video encoder and/or decoder and PHY and/or Mac layers that may include IP packet handling and/or segmentation and reassembly (SAR) functions. The Video Encoder may be implemented using X264 and a video decoder using JM Video decoder. Results from the integrated simulation may be peak signal to noise ratio (PSNR) per user per frame, taking into account packet drop, for example due to channel errors and/or due to multi users scheduling timeout.

System simulation parameters used may include:
Data source;
"fifa_cif" CIF video clip encoded at 1 Mbps CBR (constant bit rate)

Data Flow Simulator;
NAL packets buffered at the input to the wireless transmitter
NAL packets can time out if not transmitted within a time limit (150 ms)
NAL packets buffered at the output of the wireless receiver
Packets transferred to the wireless system are removed from input NAL buffer
Transmission delays can be measured
Wireless Simulator;
LTE FDD downlink shared channel compliant to 3GPP TS 36.814
Bandwidth=10 MHz
3 active sectors. Normal network load: 23 UEs. Congested: 37 UEs
TTI=1 ms. Number of TTIs simulated: 4,000
Number of users per sector=12
Scheduler options:
  M-LWDF (maximum largest weight delay first)
HARQ retransmission: maximum 4 retransmissions compare to Adaptive max HARQ 2 to 6 retransmissions
Target block error rate=10%; and
Video packet priority scheme—distance from IDR with IDR rate every 15 frames.

Figure 20:
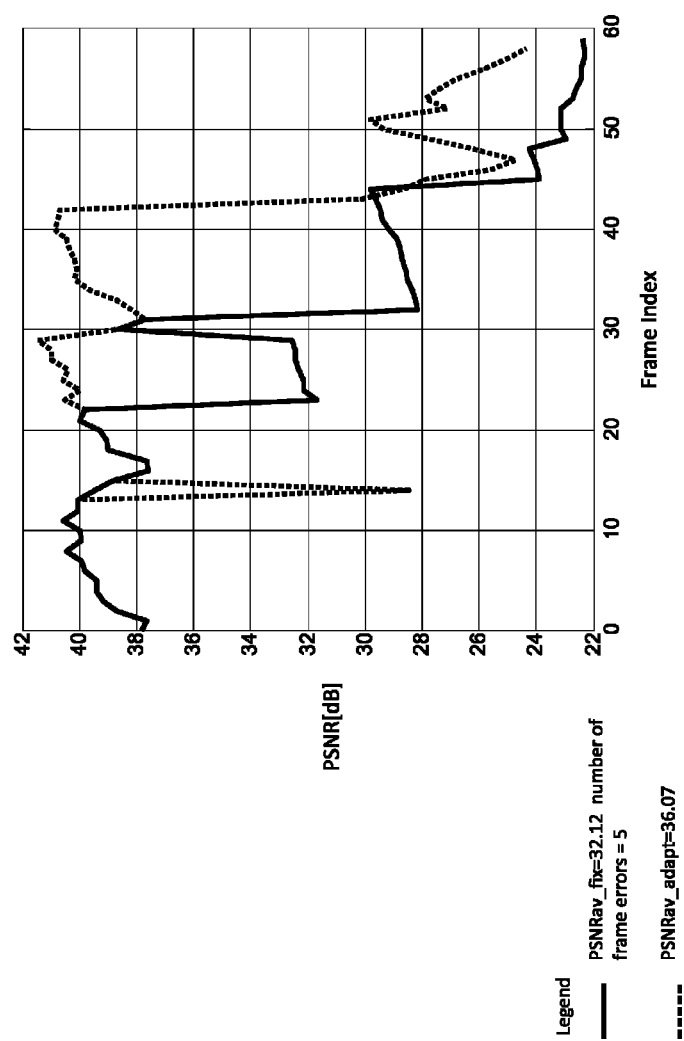
FIG. 20 is a plot depicting peak signal to noise ratios (PSNRs) per frame, instantaneous decoder refresh (IDR) frames, and error video frames.

FIG. 20 illustrates use of Adaptive MAX HARQ retransmissions. Curve 1 depicts PSNR per frame with fixed value of 4 max HARQ retransmissions. Curve 2 depicts PSNR results with Adaptive max HARQ based on video frame distance from an IDR frame. The circle points correspond to packet error in the particular Video frame and square points represent IDR frames. As depicted by curve 2, most packet errors are located just before an IDR frame, and therefore result in PSNR loss for a short period, while on curve 1 the errors are located in random locations with respect to the IDR frames, which may result in relatively longer periods of PSNR drops.

Figure 21:
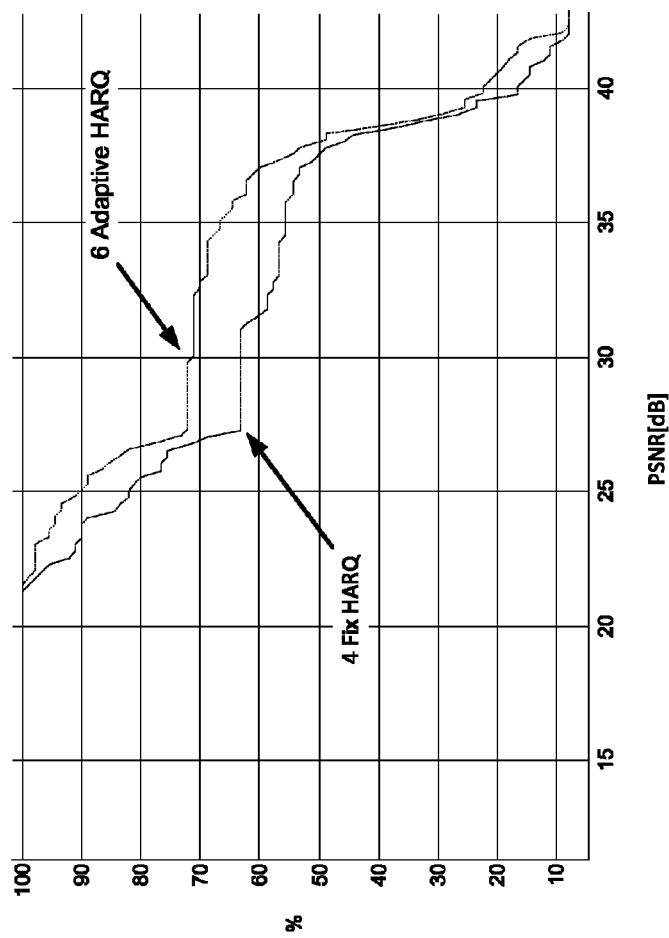
FIG. 21 is a plot illustrating percentage of packets with PSNR>x for 85% of UEs.

FIG. 21 illustrates average PSNR gain for example video sequences, including ~1 dB for the "football" example video sequence and ~0.8 dB for the "foreman" example video sequence, respectively, when considering the users. FIG. 21 depicts a metric that represents a percentage of packets with PSNR>x for 85% of the UEs. The gain of adaptive HARQ over fix HARQ may be significant (e.g., 1 dB-5 dB) for most ranges of PSNR.

FIG. 22 illustrates a performance gain that may be attributable to adaptive HARQ and LC prioritization under different system loading conditions. For low and normal system loading, the main PSNR gain may be achieved by one or more adaptive HARQ techniques. For heavy system loading conditions, the main PSNR gain may be achieved by prioritization of LCs.

In accordance with the herein-described video aware HARQ techniques, a maximum HARQ retransmission parameter may be adaptively selected, for example based on a video application packet priority. A video aware HARQ architecture with cross layer control architecture may identify one or more video packets and/or respective associated priorities, which may be used to construct each TB, and may use this information to adjust the maximum HARQ retransmissions, for instance to improve overall video performance. A video aware HARQ architecture with logical channel control may be based on establishment of multiple LCs (e.g., at both source wireless hop and destination wireless hop) with different priorities for a single video application and may map the video packets to match the priority of the video packets with the LC priority. A video aware HARQ architecture (e.g., a video aware HARQ architecture with a cross layer control architecture) may be implemented with additional messages, for instance messages synchronized to BSR for the source wireless hop, and/or with different messages that may be synchronized to a first NACK feedback for the destination wireless hop.

Figure 23A:
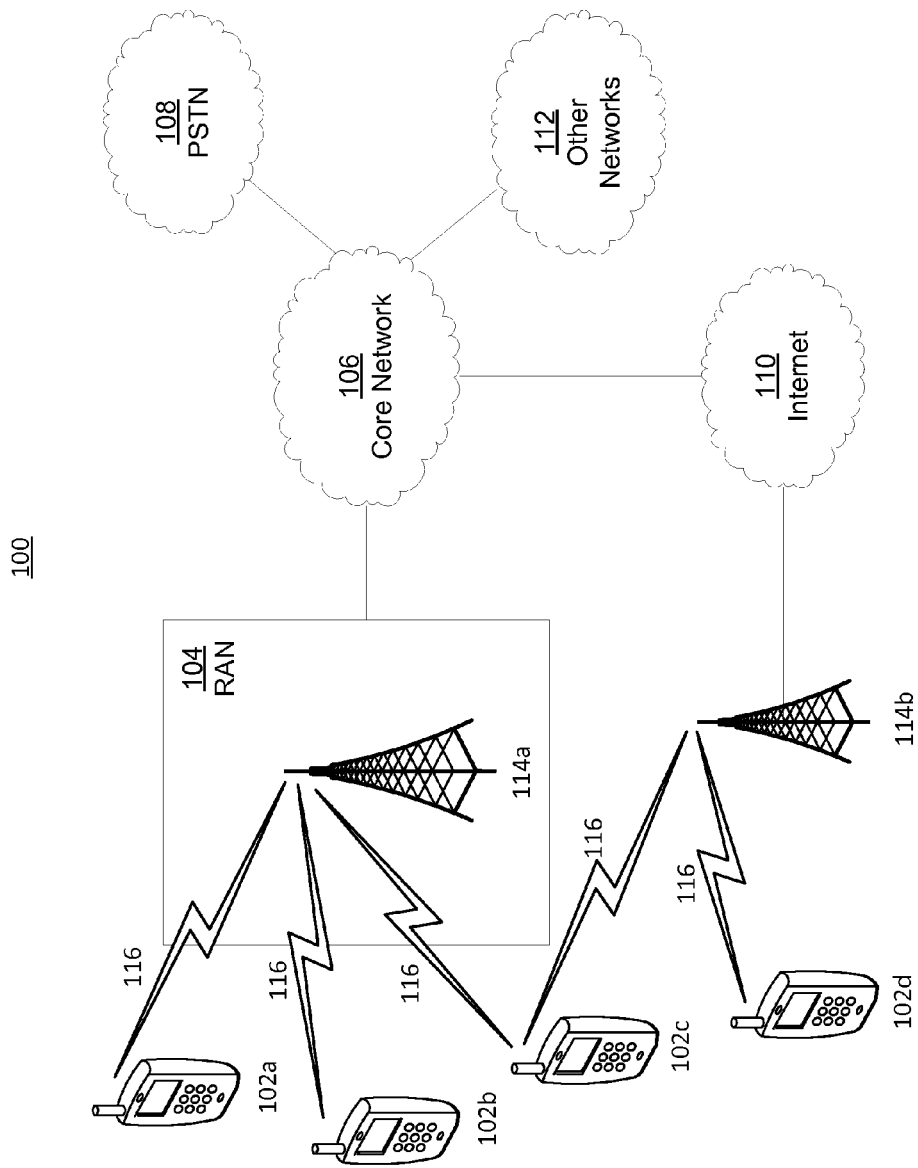
FIG. 23A depicts a system diagram of an example communications system in which one or more disclosed embodiments may be implemented.

FIG. 23A is a diagram of an example communications system 100 in which one or more disclosed embodiments may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 23A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 23A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 23A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 23A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 23A may be configured to communicate with the base station 114a, which may employ a cellular-based radio technology, and with the base station 114b, which may employ an IEEE 802 radio technology.

Figure 23B:
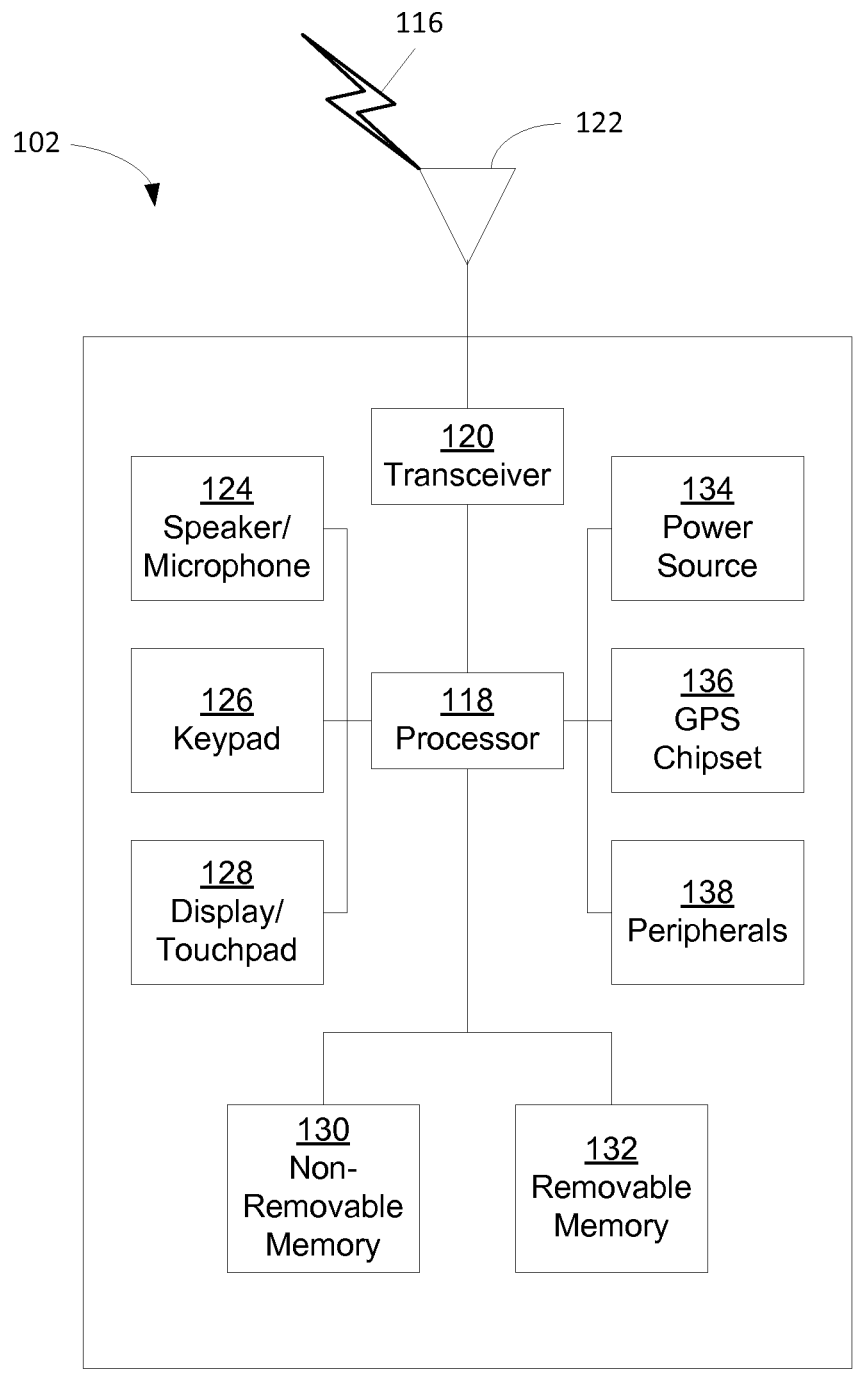
FIG. 23B depicts a system diagram of an example wireless transmit/receive unit (WTRU) that may be used within the communications system depicted in FIG. 23A.

FIG. 23B is a system diagram of an example WTRU 102. As shown in FIG. 23B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 23B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 23B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding a location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 23C:
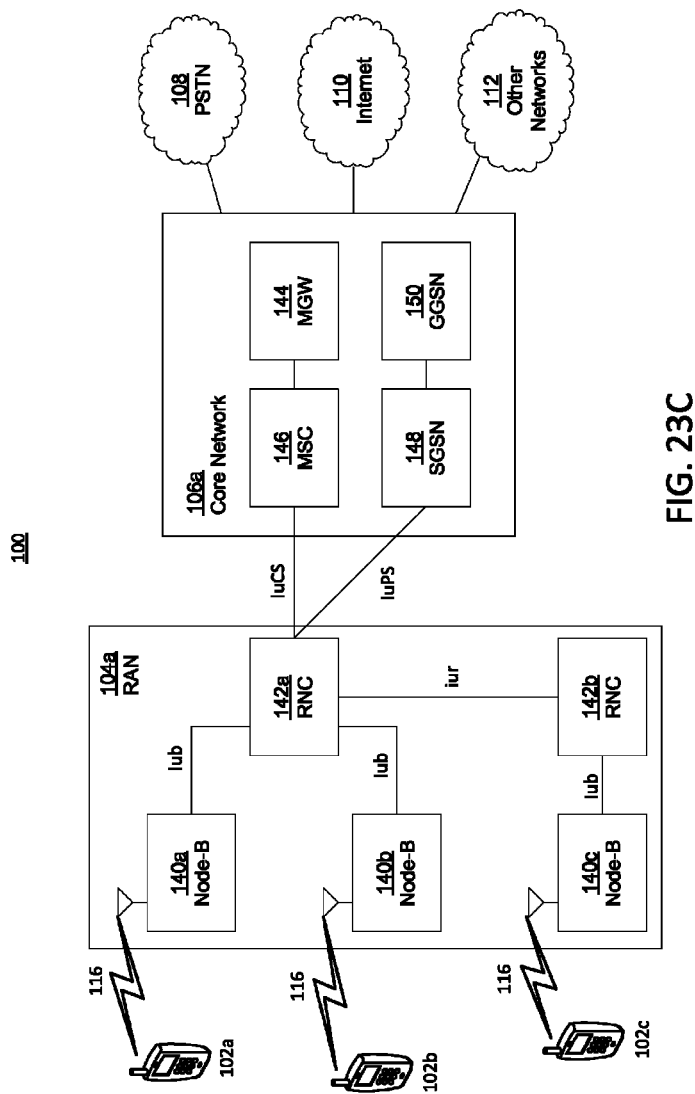
FIG. 23C depicts a system diagram of an example radio access network and an example core network that may be used within the communications system depicted in FIG. 23A.

FIG. 23C is a system diagram of an embodiment of the communications system 100 that includes a RAN 104a and a core network 106a that comprise example implementations of the RAN 104 and the core network 106, respectively. As noted above, the RAN 104, for instance the RAN 104a, may employ a UTRA radio technology to communicate with the WTRUs 102a, 102b, and 102c over the air interface 116. The RAN 104a may also be in communication with the core network 106a. As shown in FIG. 23C, the RAN 104a may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104a. The RAN 104a may also include RNCs 142a, 142b. It should be appreciated that the RAN 104a may include any number of Node-Bs and RNCs while remaining consistent with an embodiment.

As shown in FIG. 23C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 23C may include a media gateway (MGW) 144, a mobile switching center (MSC) 146, a serving GPRS support node (SGSN) 148, and/or a gateway GPRS support node (GGSN) 150. While each of the foregoing elements is depicted as part of the core network 106a, it should be appreciated that any one of these elements may be owned and/or operated by an entity other than the core network operator.

The RNC 142a in the RAN 104a may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104a may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106a may also be connected to the networks 112, which may include other wired or wireless networks that are owned and/or operated by other service providers.

Figure 23D:
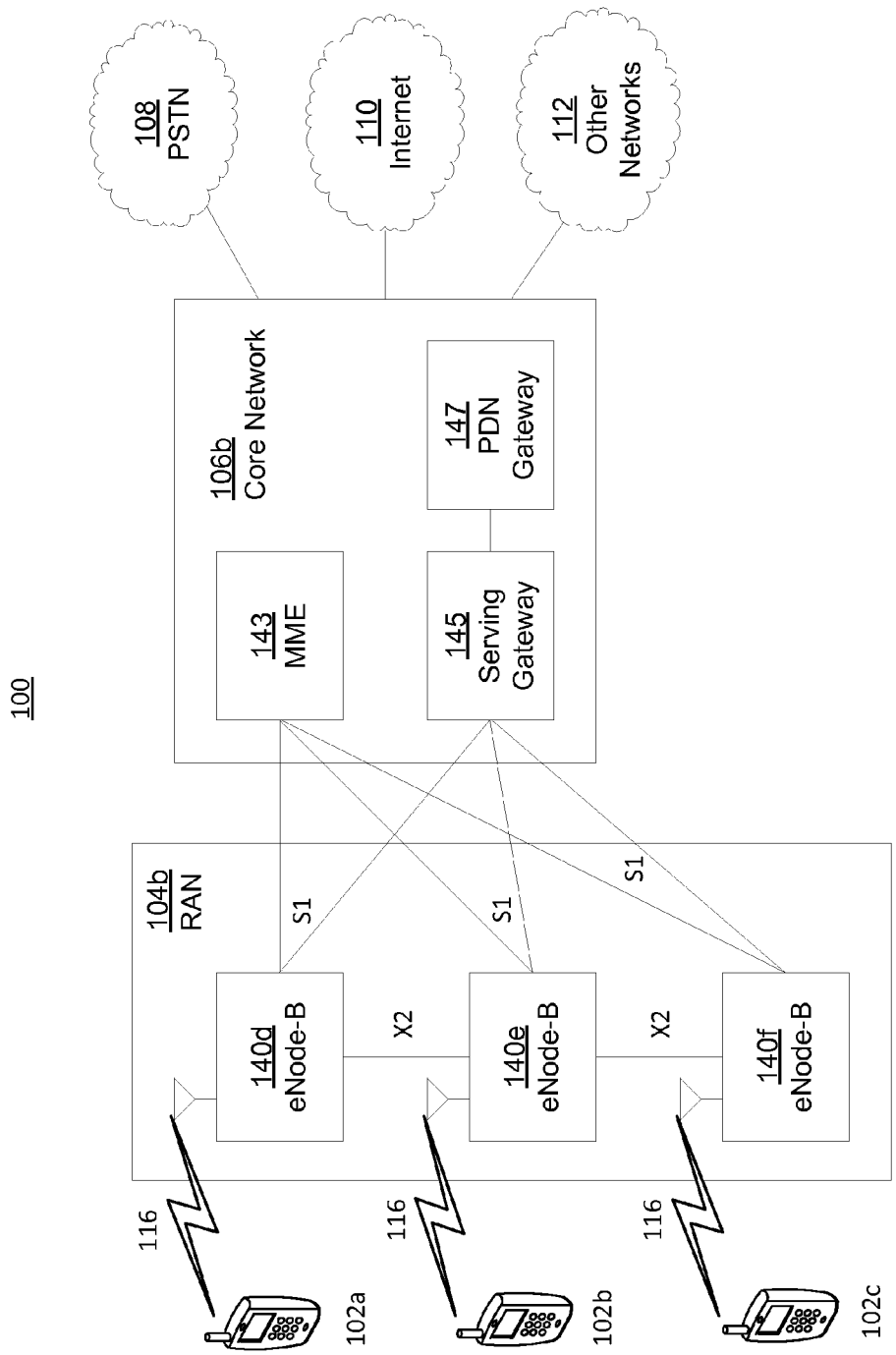
FIG. 23D depicts a system diagram of an example radio access network and an example core network that may be used within the communications system depicted in FIG. 23A.

FIG. 23D is a system diagram of an embodiment of the communications system 100 that includes a RAN 104b and a core network 106b that comprise example implementations of the RAN 104 and the core network 106, respectively. As noted above, the RAN 104, for instance the RAN 104b, may employ an E-UTRA radio technology to communicate with the WTRUs 102a, 102b, and 102c over the air interface 116. The RAN 104b may also be in communication with the core network 106b.

The RAN 104b may include eNode-Bs 140d, 140e, 140f, though it should be appreciated that the RAN 104b may include any number of eNode-Bs while remaining consistent with an embodiment. The eNode-Bs 140d, 140e, 140f may each include one or more transceivers for communicating with the WTRUs 102a, 102b, 102c over the air interface 116. In one embodiment, the eNode-Bs 140d, 140e, 140f may implement MIMO technology. Thus, the eNode-B 140d, for example, may use multiple antennas to transmit wireless signals to, and receive wireless signals from, the WTRU 102a.

Each of the eNode-Bs 140d, 140e, and 140f may be associated with a particular cell (not shown) and may be configured to handle radio resource management decisions, handover decisions, scheduling of users in the uplink and/or downlink, and the like. As shown in FIG. 23D, the eNode-Bs 140d, 140e, 140f may communicate with one another over an X2 interface.

The core network 106b shown in FIG. 23D may include a mobility management gateway (MME) 143, a serving gateway 145, and a packet data network (PDN) gateway 147. While each of the foregoing elements is depicted as part of the core network 106b, it should be appreciated that any one of these elements may be owned and/or operated by an entity other than the core network operator.

The MME 143 may be connected to each of the eNode-Bs 140d, 140e, and 140f in the RAN 104b via an S1 interface and may serve as a control node. For example, the MME 143 may be responsible for authenticating users of the WTRUs 102a, 102b, 102c, bearer activation/deactivation, selecting a particular serving gateway during an initial attach of the WTRUs 102a, 102b, 102c, and the like. The MME 143 may also provide a control plane function for switching between the RAN 104b and other RANs (not shown) that employ other radio technologies, such as GSM or WCDMA.

The serving gateway 145 may be connected to each of the eNode Bs 140d, 140e, 140f in the RAN 104b via the S1 interface. The serving gateway 145 may generally route and forward user data packets to/from the WTRUs 102a, 102b, 102c. The serving gateway 145 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 145 may also be connected to the PDN gateway 147, which may provide the WTRUs 102a, 102b, 102c with access to packet-switched networks, such as the Internet 110, to facilitate communications between the WTRUs 102a, 102b, 102c and IP-enabled devices.

The core network 106b may facilitate communications with other networks. For example, the core network 106b may provide the WTRUs 102a, 102b, 102c with access to circuit-switched networks, such as the PSTN 108, to facilitate communications between the WTRUs 102a, 102b, 102c and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102a, 102b, 102c with access to the networks 112, which may include other wired or wireless networks that are owned and/or operated by other service providers.

Figure 23E:
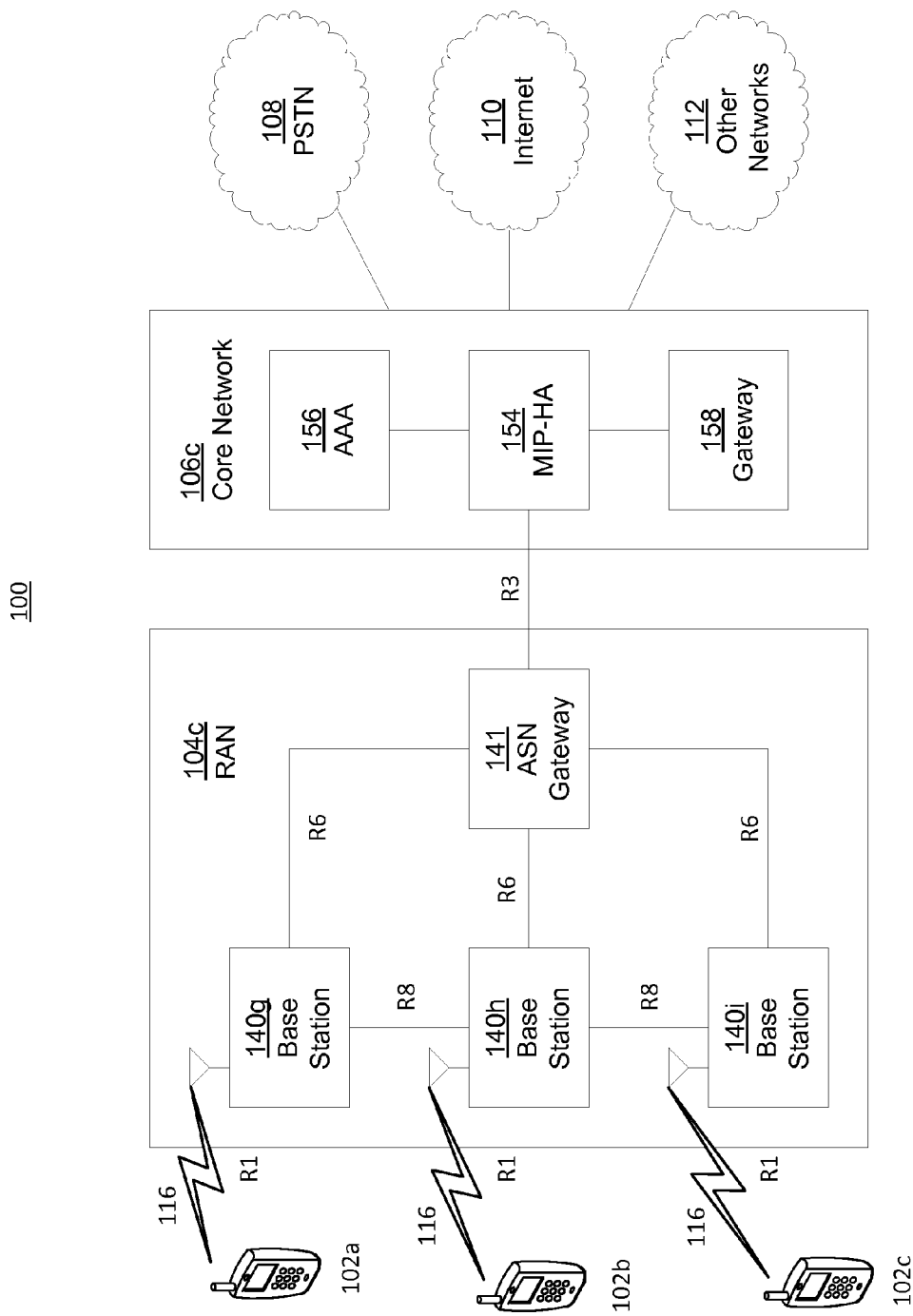
FIG. 23E depicts a system diagram of an example radio access network and an example core network that may be used within the communications system depicted in FIG. 23A.

FIG. 23E is a system diagram of an embodiment of the communications system 100 that includes a RAN 104c and a core network 106c that comprise example implementations of the RAN 104 and the core network 106, respectively. The RAN 104, for instance the RAN 104c, may be an access service network (ASN) that employs IEEE 802.16 radio technology to communicate with the WTRUs 102a, 102b, and 102c over the air interface 116. As described herein, the communication links between the different functional entities of the WTRUs 102a, 102b, 102c, the RAN 104c, and the core network 106c may be defined as reference points.

As shown in FIG. 23E, the RAN 104c may include base stations 102a, 102b, 102c, and an ASN gateway 141, though it should be appreciated that the RAN 104c may include any number of base stations and ASN gateways while remaining consistent with an embodiment. The base stations 102a, 102b, 102c may each be associated with a particular cell (not shown) in the RAN 104c and may each include one or more transceivers for communicating with the WTRUs 102a, 102b, 102c over the air interface 116. In one embodiment, the base stations 140g, 140h, 140i may implement MIMO technology. Thus, the base station 140g, for example, may use multiple antennas to transmit wireless signals to, and receive wireless signals from, the WTRU 102a. The base stations 140g, 140h, 140i may also provide mobility management functions, such as handoff triggering, tunnel establishment, radio resource management, traffic classification, quality of service (QoS) policy enforcement, and the like. The ASN Gateway 141 may serve as a traffic aggregation point and may be responsible for paging, caching of subscriber profiles, routing to the core network 106c, and the like.

The air interface 116 between the WTRUs 102a, 102b, 102c and the RAN 104c may be defined as an R1 reference point that implements the IEEE 802.16 specification. In addition, each of the WTRUs 102a, 102b, and 102c may establish a logical interface (not shown) with the core network 106c. The logical interface between the WTRUs 102a, 102b, 102c and the core network 106c may be defined as an R2 reference point, which may be used for authentication, authorization, IP host configuration management, and/or mobility management.

The communication link between each of the base stations 140g, 140h, 140i may be defined as an R8 reference point that includes protocols for facilitating WTRU handovers and the transfer of data between base stations. The communication link between the base stations 140g, 140h, 140i and the ASN gateway 141 may be defined as an R6 reference point. The R6 reference point may include protocols for facilitating mobility management based on mobility events associated with each of the WTRUs 102a, 102b, 102c.

As shown in FIG. 23E, the RAN 104c may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 144, an authentication, authorization, accounting (AAA) server 156, and a gateway 158. While each of the foregoing elements is depicted as part of the core network 106c, it should be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 154 may provide the WTRUs 102a, 102b, 102c with access to packet-switched networks, such as the Internet 110, to facilitate communications between the WTRUs 102a, 102b, 102c and IP-enabled devices. The AAA server 156 may be responsible for user authentication and for supporting user services. The gateway 158 may facilitate interworking with other networks. For example, the gateway 158 may provide the WTRUs 102a, 102b, 102c with access to circuit-switched networks, such as the PSTN 108, to facilitate communications between the WTRUs 102a, 102b, 102c and traditional landline communications devices. In addition, the gateway 158 may provide the WTRUs 102a, 102b, 102c with access to the networks 112, which may include other wired or wireless networks that are owned and/or operated by other service providers.

Although not shown in FIG. 23E, it should be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102a, 102b, 102c between the RAN 104c and the other ASNs. The communication link between the core network 106c and the other core networks may be defined as an R5 reference point, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. Features and/or elements described herein in accordance with one or more example embodiments may be used in combination with features and/or elements described herein in accordance with one or more other example embodiments.

What is claimed:

1. A method comprising:
   receiving, over a first logical channel, a first video packet associated with a video stream, the first video packet having a first priority value;
   receiving, over a second logical channel, a second video packet associated with the video stream, the second video packet having a second priority value that is different from the first priority value;
   assigning, based on receiving the first video packet over the first logical channel, a first maximum number of retransmissions to the first video packet, the first maximum number of retransmissions associated with the first logical channel;
   assigning, based on receiving the second video packet over the second logical channel, a second maximum number of retransmissions to the second video packet, the second maximum number of retransmissions associated with the second logical channel, wherein the first maximum number of retransmissions is different from the second maximum number of retransmissions;
   transmitting, using Radio Resource Control (RRC) protocol, data identifying that the first maximum number of retransmissions is associated with the first logical channel;
   transmitting, using Radio Resource Control (RRC) protocol, data identifying that the second maximum number of retransmissions is associated with the second logical channel;
   transmitting, in accordance with the first maximum number of retransmissions, the first video packet over a first evolved packet system (EPS) bearer that is mapped to the first logical channel; and
   transmitting, in accordance with the second maximum number of retransmissions, the second video packet over a second EPS bearer that is different from the first EPS bearer and that is mapped to the second logical channel,
   wherein the first and second logical channels are used by a video application that is associated with the video stream.

2. The method of claim 1, further comprising:
   associating the first logical channel with a first transmission queue having a first priority designation; and
   associating the second logical channel with a second transmission queue having a second priority designation that is different from the first priority designation.

3. The method of claim 2, further comprising:
   placing the first video packet in the first transmission queue;
   placing the second video packet in the second transmission queue;
   determining whether an amount of time that the second video packet has resided in the second transmission queue surpasses a specified delay limit; and
   if the amount of time does not surpass the delay limit, transmitting the first video packet before transmitting the second video packet.

4. The method of claim 1,
   wherein the first logical channel is associated with a first quality of service class identifier (QCI) value; and
   wherein the second logical channel is associated with a second QCI value.

5. The method of claim 1, wherein the retransmissions of the first and second maximum number of retransmissions are hybrid automatic repeat request (HARQ) retransmissions and the method further comprises transmitting the first and second maximum number of HARQ retransmissions to a user equipment associated with the video stream.

6. The method of claim 1, further comprising:
   placing the first and second video packets into a transmission queue; and determining whether to reorder the first and second video packets with respect to each other within the transmission queue.

7. The method of claim 1,
wherein transmitting, using RRC protocol, data identifying that the first maximum number of retransmissions is associated with the first logical channel comprises transmitting data to a network device; and
wherein transmitting, using RRC protocol, data identifying that the second maximum number of retransmissions is associated with the second logical channel comprises transmitting data to the network device.

8. The method of claim 7, wherein transmitting data to the network device comprises transmitting data via a physical uplink shared channel (PUSCH).

9. The method of claim 7, further comprising transmitting a third maximum number of retransmissions for use with a particular message sequence in a non-acknowledgment (NACK) feedback transmission.

10. The method of claim 1, further comprising receiving priority information for the video stream from the video application, via a communication from an application layer, wherein each of the first logical channel and the second logical channel are associated with a priority.

11. The method of claim 1, further comprising receiving priority information for the video stream, wherein the priority information is related to a previously received video packet of the video stream.

12. A network device configured to transmit a video stream, the network device comprising:
a processor; and
a memory comprising instructions that when executed by the processor cause the network device to:
receive, over a first logical channel, a first video packet associated with the video stream, the first video packet having a first priority value;
receive, over a second logical channel, a second video packet associated with the video stream, the second video packet having a second priority value that is different from the first priority value;
assign, based on receiving the first video packet over the first logical channel, a first maximum number of retransmissions to the first video packet, the first maximum number of retransmissions associated with the first logical channel;
assign, based on receiving the second video packet over the second logical channel, a second maximum number of retransmissions to the second video packet, the second maximum number of retransmissions associated with the second logical channel, wherein the first maximum number of retransmissions is different from the second maximum number of retransmissions;
transmit, using Radio Resource Control (RRC) protocol, data identifying that the first maximum number of retransmissions is associated with the first logical channel;
transmit, using Radio Resource Control (RRC) protocol, data identifying that the second maximum number of retransmissions is associated with the second logical channel;
transmit, in accordance with the first maximum number of retransmissions, the first video packet over a first evolved packet system (EPS) bearer that is mapped to the first logical channel; and
transmit, in accordance with the second maximum number of retransmissions, the second video packet over a second EPS bearer that is different from the first EPS bearer and that is mapped to the second logical channel,
wherein the first and second logical channels are used by a video application that is associated with the video stream.

13. The network device of claim 12, wherein the instructions, when executed by the processor, further cause the network device to:
associate the first logical channel with a first transmission queue having a first priority designation; and
associate the second logical channel with a second transmission queue having a second priority designation that is different from the first priority designation.

14. The network device of claim 13, wherein the instructions, when executed by the processor, further cause the network device to:
place the first video packet in the first transmission queue;
place the second video packet in the second transmission queue;
determine whether an amount of time that the second video packet has resided in the second transmission queue surpasses a specified delay limit; and
if the amount of time does not surpass the delay limit, cause the first video packet to be transmitted before the second video packet.

15. The network device of claim 12,
wherein the first logical channel is associated with a first quality of service class identifier (QCI) value; and
wherein the second logical channel is associated with a second QCI value.

16. The network device of claim 12, wherein the retransmissions of the first and second maximum number of retransmissions are hybrid automatic repeat request (HARQ) retransmissions and the processor is further configured to transmit the first and second maximum number of HARQ retransmissions to a user equipment associated with the video stream.

17. The network device of claim 12, wherein the instructions, when executed by the processor, further cause the network device to:
place the first and second video packets into a transmission queue; and
determine whether to reorder the first and second video packets with respect to each other within the transmission queue.

18. A user equipment (UE) comprising:
a processor; and
a memory comprising instructions that when executed by the processor cause the UE to:
receive, over a first logical channel, a first video packet associated with a video stream, the first video packet having a first priority value;
receive, over a second logical channel, a second video packet associated with the video stream, the second video packet having a second priority value that is different from the first priority value;
assign, based on receiving the first video packet over the first logical channel, a first maximum number of retransmissions to the first video packet, the first maximum number of retransmissions associated with the first logical channel;
assign, based on receiving the second video packet over the second logical channel, a second maximum number of retransmissions to the second video packet, the second maximum number of retransmissions associated with the second logical channel, wherein the first maximum number of retransmissions is different from the second maximum number of retransmissions;

transmit, in a MAC PDU including a buffer status report, data identifying that the first maximum number of retransmissions is associated with the first logical channel;

transmit, in a MAC PDU including a buffer status report, data identifying that the second maximum number of retransmissions is associated with the second logical channel;

transmit, in accordance with the first maximum number of retransmissions, the first video packet over a first evolved packet system (EPS) bearer that is mapped to the first logical channel; and transmit, in accordance with the second maximum number of retransmissions, the second video packet over a second EPS bearer that is different from the first EPS bearer and that is mapped to the second logical channel, wherein the first and second logical channels are used by a video application that is associated with the video stream.

19. The UE of claim 18, wherein the data identifying that the first maximum number of retransmissions is associated with the first logical channel is transmitted to a network device; and wherein the data identifying that the second maximum number of retransmissions is associated with the second logical channel is transmitted to the network device.

20. The UE of claim 19, wherein the data identifying that the first maximum number of retransmissions is associated with the first logical channel is transmitted via a physical uplink shared channel (PUSCH), and wherein the data identifying that the second maximum number of retransmissions is associated with the second logical channel is transmitted via the PUSCH.

21. The UE of claim 19, wherein the instructions, when executed by the processor further cause the UE to:

transmit a third maximum number of retransmissions for use with a particular message sequence on the first logical channel in a non-acknowledgement (NACK) feedback transmission, and transmit a fourth maximum number of retransmissions for use with a particular message sequence on the second logical channel in a non-acknowledgement (NACK) feedback transmission.

22. The UE of claim 18, wherein the instructions, when executed by the processor, further cause the UE to:

receive priority information for the video stream from the video application, via a communication from an application layer, wherein each of the first logical channel and the second logical channel are associated with a priority.

23. The UE of claim 18, wherein the instructions, when executed by the processor, further cause the UE to receive priority information for the video stream, the priority information related to a previously received video packet of the video stream.

* * * * *